(12) United States Patent
Chui

(10) Patent No.: US 7,373,026 B2
(45) Date of Patent: May 13, 2008

(54) MEMS DEVICE FABRICATED ON A PRE-PATTERNED SUBSTRATE

(75) Inventor: Clarence Chui, San Mateo, CA (US)

(73) Assignee: IDC, LLC, San Francisco, CA (US)

( * ) Notice: Subject to any disclaimer, the term of this patent is extended or adjusted under 35 U.S.C. 154(b) by 223 days.

(21) Appl. No.: 11/174,220

(22) Filed: Jul. 1, 2005

(65) Prior Publication Data

US 2006/0067646 A1    Mar. 30, 2006

Related U.S. Application Data

(60) Provisional application No. 60/613,376, filed on Sep. 27, 2004.

(51) Int. Cl.
*G02F 1/295* (2006.01)
(52) U.S. Cl. .................... 385/8; 359/318; 362/620
(58) Field of Classification Search ............ 385/8; 359/318; 345/85; 438/607; 362/620
See application file for complete search history.

(56) References Cited

U.S. PATENT DOCUMENTS

| | | |
|---|---|---|
| 2,534,846 A | 12/1950 | Ambrose et al. |
| 3,439,973 A | 4/1969 | Paul et al. |
| 3,443,854 A | 5/1969 | Weiss |
| 3,616,312 A | 10/1971 | McGriff et al. |
| 3,653,741 A | 4/1972 | Marks |
| 3,656,836 A | 4/1972 | de Cremoux et al. |
| 3,725,868 A | 4/1973 | Malmer, Jr. et al. |
| 3,813,265 A | 5/1974 | Marks |
| 3,955,880 A | 5/1976 | Lierke |
| 4,099,854 A | 7/1978 | Decker et al. |
| 4,196,396 A | 4/1980 | Smith |
| 4,228,437 A | 10/1980 | Shelton |
| 4,377,324 A | 3/1983 | Durand et al. |
| 4,389,096 A | 6/1983 | Hori et al. |
| 4,403,248 A | 9/1983 | te Velde |
| 4,441,791 A | 4/1984 | Hornbeck |
| 4,445,050 A | 4/1984 | Marks |
| 4,459,182 A | 7/1984 | te Velde |
| 4,482,213 A | 11/1984 | Piliavin et al. |
| 4,500,171 A | 2/1985 | Penz et al. |

(Continued)

FOREIGN PATENT DOCUMENTS

CH        681 047 A5    12/1992

(Continued)

OTHER PUBLICATIONS

Akasaka, "Three-Dimensional IC Trends," Proceedings of IEEE, vol. 74, No. 12, pp. 1703-1714, (Dec. 1986).

(Continued)

*Primary Examiner*—Michelle R. Connelly-Cushwa
*Assistant Examiner*—Jerry T. Rahll
(74) *Attorney, Agent, or Firm*—Knobbe Martens Olson & Bear LLP

(57) ABSTRACT

A microelectromechanical systems device fabricated on a pre-patterned substrate having grooves formed therein. A lower electrode is deposited over the substrate and separated by an orthogonal upper electrode by a cavity. The upper electrode is configured to be movable to modulate reflected light. A semi-reflective layer and a transparent material are formed over the movable upper electrode.

17 Claims, 13 Drawing Sheets

U.S. PATENT DOCUMENTS

| | | |
|---|---|---|
| 4,519,676 A | 5/1985 | te Velde |
| 4,531,126 A | 7/1985 | Sadones |
| 4,566,935 A | 1/1986 | Hornbeck |
| 4,571,603 A | 2/1986 | Hornbeck et al. |
| 4,596,992 A | 6/1986 | Hornbeck |
| 4,615,595 A | 10/1986 | Hornbeck |
| 4,617,608 A | 10/1986 | Blonder et al. |
| 4,662,746 A | 5/1987 | Hornbeck |
| 4,663,083 A | 5/1987 | Marks |
| 4,681,403 A | 7/1987 | te Velde et al. |
| 4,710,732 A | 12/1987 | Hornbeck |
| 4,748,366 A | 5/1988 | Taylor |
| 4,786,128 A | 11/1988 | Birnbach |
| 4,790,635 A | 12/1988 | Apsley |
| 4,856,863 A | 8/1989 | Sampsell et al. |
| 4,859,060 A | 8/1989 | Katagiri et al. |
| 4,900,136 A | 2/1990 | Goldburt et al. |
| 4,900,395 A | 2/1990 | Syverson et al. |
| 4,937,496 A | 6/1990 | Neiger et al. |
| 4,954,789 A | 9/1990 | Sampsell |
| 4,956,619 A | 9/1990 | Hornbeck |
| 4,965,562 A | 10/1990 | Verhulst |
| 4,982,184 A | 1/1991 | Kirkwood |
| 5,018,256 A | 5/1991 | Hornbeck |
| 5,022,745 A | 6/1991 | Zahowski et al. |
| 5,028,939 A | 7/1991 | Hornbeck et al. |
| 5,037,173 A | 8/1991 | Sampsell et al. |
| 5,044,736 A | 9/1991 | Jaskie et al. |
| 5,061,049 A | 10/1991 | Hornbeck |
| 5,075,796 A | 12/1991 | Schildkraut et al. |
| 5,078,479 A | 1/1992 | Vuilleumier |
| 5,079,544 A | 1/1992 | DeMond et al. |
| 5,083,857 A | 1/1992 | Hornbeck |
| 5,096,279 A | 3/1992 | Hornbeck et al. |
| 5,099,353 A | 3/1992 | Hornbeck |
| 5,124,834 A | 6/1992 | Cusano et al. |
| 5,136,669 A | 8/1992 | Gerdt |
| 5,142,405 A | 8/1992 | Hornbeck |
| 5,142,414 A | 8/1992 | Koehler |
| 5,153,771 A | 10/1992 | Link et al. |
| 5,162,787 A | 11/1992 | Thompson et al. |
| 5,168,406 A | 12/1992 | Nelson |
| 5,170,156 A | 12/1992 | DeMond et al. |
| 5,172,262 A | 12/1992 | Hornbeck |
| 5,179,274 A | 1/1993 | Sampsell |
| 5,192,395 A | 3/1993 | Boysel et al. |
| 5,192,946 A | 3/1993 | Thompson et al. |
| 5,206,629 A | 4/1993 | DeMond et al. |
| 5,212,582 A | 5/1993 | Nelson |
| 5,214,419 A | 5/1993 | DeMond et al. |
| 5,214,420 A | 5/1993 | Thompson et al. |
| 5,216,537 A | 6/1993 | Hornbeck |
| 5,226,099 A | 7/1993 | Mignardi et al. |
| 5,228,013 A | 7/1993 | Bik |
| 5,231,532 A | 7/1993 | Magel et al. |
| 5,233,385 A | 8/1993 | Sampsell |
| 5,233,456 A | 8/1993 | Nelson |
| 5,233,459 A | 8/1993 | Bozler et al. |
| 5,254,980 A | 10/1993 | Hendrix et al. |
| 5,272,473 A | 12/1993 | Thompson et al. |
| 5,278,652 A | 1/1994 | Urbanus et al. |
| 5,280,277 A | 1/1994 | Hornbeck |
| 5,287,096 A | 2/1994 | Thompson et al. |
| 5,293,272 A | 3/1994 | Jannson et al. |
| 5,296,950 A | 3/1994 | Lin et al. |
| 5,299,041 A | 3/1994 | Morin et al. |
| 5,305,640 A | 4/1994 | Boysel et al. |
| 5,311,360 A | 5/1994 | Bloom et al. |
| 5,312,513 A | 5/1994 | Florence et al. |
| 5,323,002 A | 6/1994 | Sampsell et al. |
| 5,324,683 A | 6/1994 | Fitch et al. |
| 5,325,116 A | 6/1994 | Sampsell |
| 5,326,430 A | 7/1994 | Cronin et al. |
| 5,327,286 A | 7/1994 | Sampsell et al. |
| 5,330,617 A | 7/1994 | Haond |
| 5,331,454 A | 7/1994 | Hornbeck |
| 5,339,116 A | 8/1994 | Urbanus et al. |
| 5,345,328 A | 9/1994 | Fritz et al. |
| 5,347,377 A | 9/1994 | Revelli, Jr. et al. |
| 5,355,357 A | 10/1994 | Yamamori et al. |
| 5,358,601 A | 10/1994 | Cathey |
| 5,365,283 A | 11/1994 | Doherty et al. |
| 5,381,232 A | 1/1995 | van Wijk |
| 5,381,253 A | 1/1995 | Sharp et al. |
| 5,401,983 A | 3/1995 | Jokerst et al. |
| 5,411,769 A | 5/1995 | Hornbeck |
| 5,444,566 A | 8/1995 | Gale et al. |
| 5,446,479 A | 8/1995 | Thompson et al. |
| 5,448,314 A | 9/1995 | Heimbuch et al. |
| 5,452,024 A | 9/1995 | Sampsell |
| 5,454,906 A | 10/1995 | Baker et al. |
| 5,457,493 A | 10/1995 | Leddy et al. |
| 5,457,566 A | 10/1995 | Sampsell et al. |
| 5,459,602 A | 10/1995 | Sampsell |
| 5,459,610 A | 10/1995 | Bloom et al. |
| 5,461,411 A | 10/1995 | Florence et al. |
| 5,474,865 A | 12/1995 | Vasudev |
| 5,488,505 A | 1/1996 | Engle |
| 5,489,952 A | 2/1996 | Gove et al. |
| 5,497,172 A | 3/1996 | Doherty et al. |
| 5,497,197 A | 3/1996 | Gove et al. |
| 5,499,037 A | 3/1996 | Nakagawa et al. |
| 5,499,062 A | 3/1996 | Urbanus |
| 5,500,635 A | 3/1996 | Mott |
| 5,500,761 A | 3/1996 | Goossen et al. |
| 5,503,952 A | 4/1996 | Suzuki et al. |
| 5,506,597 A | 4/1996 | Thompson et al. |
| 5,515,076 A | 5/1996 | Thompson et al. |
| 5,517,347 A | 5/1996 | Sampsell |
| 5,523,803 A | 6/1996 | Urbanus et al. |
| 5,526,051 A | 6/1996 | Gove et al. |
| 5,526,172 A | 6/1996 | Kanack |
| 5,526,327 A | 6/1996 | Cordova, Jr. |
| 5,526,688 A | 6/1996 | Boysel et al. |
| 5,535,047 A | 7/1996 | Hornbeck |
| 5,548,301 A | 8/1996 | Kornher et al. |
| 5,551,293 A | 9/1996 | Boysel et al. |
| 5,552,924 A | 9/1996 | Tregilgas |
| 5,552,925 A | 9/1996 | Worley |
| 5,559,358 A | 9/1996 | Burns et al. |
| 5,563,398 A | 10/1996 | Sampsell |
| 5,567,334 A | 10/1996 | Baker et al. |
| 5,570,135 A | 10/1996 | Gove et al. |
| 5,578,976 A | 11/1996 | Yao |
| 5,579,149 A | 11/1996 | Moret et al. |
| 5,581,272 A | 12/1996 | Conner et al. |
| 5,583,688 A | 12/1996 | Hornbeck |
| 5,589,852 A | 12/1996 | Thompson et al. |
| 5,597,736 A | 1/1997 | Sampsell |
| 5,600,383 A | 2/1997 | Hornbeck |
| 5,602,671 A | 2/1997 | Hornbeck |
| 5,606,441 A | 2/1997 | Florence et al. |
| 5,608,468 A | 3/1997 | Gove et al. |
| 5,610,438 A | 3/1997 | Wallace et al. |
| 5,610,624 A | 3/1997 | Bhuva |
| 5,610,625 A | 3/1997 | Sampsell |
| 5,619,059 A | 4/1997 | Li et al. |
| 5,619,365 A | 4/1997 | Rhoads et al. |
| 5,619,366 A | 4/1997 | Rhoads et al. |
| 5,622,814 A | 4/1997 | Miyata et al. |
| 5,629,790 A | 5/1997 | Neukermans et al. |
| 5,633,652 A | 5/1997 | Kanbe et al. |
| 5,636,052 A | 6/1997 | Arney et al. |
| 5,636,185 A | 6/1997 | Brewer et al. |

| | | | | | | |
|---|---|---|---|---|---|---|
| 5,638,084 | A | 6/1997 | Kalt | 6,243,149 B1 | 6/2001 | Swanson et al. |
| 5,638,946 | A | 6/1997 | Zavracky | 6,246,398 B1 | 6/2001 | Koo |
| 5,641,391 | A | 6/1997 | Hunter et al. | 6,249,039 B1 | 6/2001 | Harvey et al. |
| 5,646,768 | A | 7/1997 | Kaeriyama | 6,282,010 B1 | 8/2001 | Sulzbach et al. |
| 5,647,819 | A | 7/1997 | Fujita et al. | 6,284,560 B1 | 9/2001 | Jech et al. |
| 5,650,834 | A | 7/1997 | Nakagawa et al. | 6,295,154 B1 | 9/2001 | Laor et al. |
| 5,650,881 | A | 7/1997 | Hornbeck | 6,323,982 B1 | 11/2001 | Hornbeck |
| 5,654,741 | A | 8/1997 | Sampsell et al. | 6,327,071 B1 | 12/2001 | Kimura et al. |
| 5,657,099 | A | 8/1997 | Doherty et al. | 6,329,297 B1 | 12/2001 | Balish et al. |
| 5,659,374 | A | 8/1997 | Gale, Jr. et al. | 6,333,556 B1 | 12/2001 | Juengling et al. |
| 5,665,997 | A | 9/1997 | Weaver et al. | 6,335,831 B2 | 1/2002 | Kowarz et al. |
| 5,668,913 | A * | 9/1997 | Tai et al. .................... 385/146 | 6,351,329 B1 | 2/2002 | Greywal |
| 5,673,139 | A | 9/1997 | Johnson | 6,356,254 B1 | 3/2002 | Kimura |
| 5,674,757 | A | 10/1997 | Kim | 6,376,787 B1 | 4/2002 | Martin et al. |
| 5,683,591 | A | 11/1997 | Offenberg | 6,391,675 B1 | 5/2002 | Ehmke et al. |
| 5,703,710 | A | 12/1997 | Brinkman et al. | 6,392,233 B1 | 5/2002 | Channin et al. |
| 5,706,022 | A | 1/1998 | Hato | 6,392,781 B1 | 5/2002 | Kim et al. |
| 5,710,656 | A | 1/1998 | Goossen | 6,407,851 B1 | 6/2002 | Islam et al. |
| 5,726,480 | A | 3/1998 | Pister | 6,447,126 B1 | 9/2002 | Hornbeck |
| 5,737,050 | A | 4/1998 | Takahara et al. | 6,452,124 B1 | 9/2002 | York et al. |
| 5,739,945 | A | 4/1998 | Tayebati | 6,452,465 B1 | 9/2002 | Brown et al. |
| 5,745,193 | A | 4/1998 | Urbanus et al. | 6,456,420 B1 | 9/2002 | Goodwin-Johansson |
| 5,745,281 | A | 4/1998 | Yi et al. | 6,465,355 B1 | 10/2002 | Horsley |
| 5,771,116 | A | 6/1998 | Miller et al. | 6,466,354 B1 | 10/2002 | Gudeman |
| 5,771,321 | A | 6/1998 | Stern | 6,466,358 B2 | 10/2002 | Tew |
| 5,784,189 | A | 7/1998 | Bozler et al. | 6,473,274 B1 | 10/2002 | Maimone et al. |
| 5,784,190 | A | 7/1998 | Worley | 6,480,177 B2 | 11/2002 | Doherty et al. |
| 5,784,212 | A | 7/1998 | Hornbeck | 6,496,122 B2 | 12/2002 | Sampsell |
| 5,793,504 | A | 8/1998 | Stoll | 6,513,911 B1 | 2/2003 | Ozaki et al. |
| 5,808,780 | A | 9/1998 | McDonald | 6,522,801 B1 | 2/2003 | Aksyuk et al. |
| 5,818,095 | A | 10/1998 | Sampsell | 6,531,945 B1 | 3/2003 | Ahn et al. |
| 5,822,170 | A | 10/1998 | Cabuz et al. | 6,537,427 B1 | 3/2003 | Raina et al. |
| 5,824,608 | A | 10/1998 | Gotoch et al. | 6,545,335 B1 | 4/2003 | Chua et al. |
| 5,825,528 | A | 10/1998 | Goossen | 6,548,908 B2 | 4/2003 | Chua et al. |
| 5,835,255 | A | 11/1998 | Miles | 6,549,338 B1 | 4/2003 | Wolverton et al. |
| 5,835,256 | A | 11/1998 | Huibers | 6,552,840 B2 | 4/2003 | Knipe |
| 5,838,484 | A | 11/1998 | Goossen et al. | 6,574,033 B1 | 6/2003 | Chui et al. |
| 5,842,088 | A | 11/1998 | Thompson | 6,577,785 B1 | 6/2003 | Spahn et al. |
| 5,867,302 | A | 2/1999 | Fleming et al. | 6,589,625 B1 | 7/2003 | Kothari et al. |
| 5,912,758 | A | 6/1999 | Knipe et al. | 6,600,201 B2 | 7/2003 | Hartwell et al. |
| 5,943,155 | A | 8/1999 | Goossen | 6,606,175 B1 | 8/2003 | Sampsell et al. |
| 5,943,158 | A | 8/1999 | Ford et al. | 6,608,268 B1 | 8/2003 | Goldsmith |
| 5,959,763 | A | 9/1999 | Bozler et al. | 6,610,440 B1 | 8/2003 | LaFollette et al. |
| 5,967,163 | A | 10/1999 | Pan et al. | 6,624,944 B1 | 9/2003 | Wallace et al. |
| 5,972,193 | A | 10/1999 | Chou et al. | 6,625,047 B2 | 9/2003 | Coleman, Jr. |
| 5,976,902 | A | 11/1999 | Shih | 6,630,786 B2 | 10/2003 | Cummings et al. |
| 5,986,796 | A | 11/1999 | Miles | 6,632,698 B2 | 10/2003 | Ives |
| 6,016,693 | A | 1/2000 | Viani et al. | 6,635,919 B1 | 10/2003 | Melendez et al. |
| 6,028,690 | A | 2/2000 | Carter et al. | 6,639,724 B2 | 10/2003 | Bower et al. |
| 6,031,653 | A | 2/2000 | Wang | 6,642,913 B1 | 11/2003 | Kimura et al. |
| 6,038,056 | A | 3/2000 | Florence et al. | 6,643,069 B2 | 11/2003 | Dewald |
| 6,040,937 | A | 3/2000 | Miles | 6,650,455 B2 | 11/2003 | Miles |
| 6,049,317 | A | 4/2000 | Thompson et al. | 6,653,997 B2 * | 11/2003 | Van Gorkom et al. ........ 345/85 |
| 6,055,090 | A | 4/2000 | Miles | 6,657,832 B2 | 12/2003 | Williams et al. |
| 6,057,903 | A | 5/2000 | Colgan et al. | 6,666,561 B1 | 12/2003 | Blakley |
| 6,061,075 | A | 5/2000 | Nelson et al. | 6,674,033 B1 | 1/2004 | Wang |
| 6,088,162 | A | 7/2000 | Someno | 6,674,562 B1 | 1/2004 | Miles et al. |
| 6,097,145 | A | 8/2000 | Kastalsky et al. | 6,680,792 B2 | 1/2004 | Miles |
| 6,099,132 | A | 8/2000 | Kaeriyama | 6,710,908 B2 | 3/2004 | Miles et al. |
| 6,100,872 | A | 8/2000 | Aratani et al. | 6,720,267 B1 | 4/2004 | Chen et al. |
| 6,113,239 | A | 9/2000 | Sampsell et al. | 6,736,987 B1 | 5/2004 | Cho |
| 6,115,326 | A | 9/2000 | Puma et al. | 6,741,377 B2 | 5/2004 | Miles |
| 6,137,150 | A | 10/2000 | Takeuchi et al. | 6,741,384 B1 | 5/2004 | Martin et al. |
| 6,147,790 | A | 11/2000 | Meier et al. | 6,741,503 B1 | 5/2004 | Farris et al. |
| 6,158,156 | A | 12/2000 | Patrick | 6,743,570 B2 | 6/2004 | Harnett et al. |
| 6,160,833 | A | 12/2000 | Floyd et al. | 6,747,785 B2 | 6/2004 | Chen et al. |
| 6,166,422 | A | 12/2000 | Qian et al. | 6,747,800 B1 | 6/2004 | Lin |
| 6,180,428 | B1 | 1/2001 | Peeters et al. | 6,756,317 B2 | 6/2004 | Sniegowski et al. |
| 6,194,323 | B1 | 2/2001 | Downey et al. | 6,768,097 B1 | 7/2004 | Viktorovitch et al. |
| 6,195,196 | B1 | 2/2001 | Kimura et al. | 6,775,174 B2 | 8/2004 | Huffman et al. |
| 6,201,633 | B1 | 3/2001 | Peeters et al. | 6,778,155 B2 | 8/2004 | Doherty et al. |
| 6,204,080 | B1 | 3/2001 | Hwang | 6,778,306 B2 | 8/2004 | Sniegowski et al. |
| 6,232,936 | B1 | 5/2001 | Gove et al. | 6,791,441 B2 | 9/2004 | Pillans et al. |

| | | |
|---|---|---|
| 6,794,119 B2 | 9/2004 | Miles |
| 6,811,267 B1 | 11/2004 | Allen et al. |
| 6,812,482 B2 | 11/2004 | Fleming et al. |
| 6,819,469 B1 | 11/2004 | Koba |
| 6,822,628 B2 | 11/2004 | Dunphy et al. |
| 6,829,132 B2 | 12/2004 | Martin et al. |
| 6,844,959 B2 | 1/2005 | Huibers et al. |
| 6,853,129 B1 | 2/2005 | Cummings et al. |
| 6,855,610 B2 | 2/2005 | Tung et al. |
| 6,859,218 B1 | 2/2005 | Luman et al. |
| 6,859,301 B1 | 2/2005 | Islam et al. |
| 6,861,277 B1 | 3/2005 | Monroe et al. |
| 6,862,022 B2 | 3/2005 | Slupe |
| 6,862,029 B1 | 3/2005 | D'Souza et al. |
| 6,867,896 B2 | 3/2005 | Miles |
| 6,870,581 B2 | 3/2005 | Li et al. |
| 6,870,654 B2 | 3/2005 | Lin et al. |
| 6,882,458 B2 | 4/2005 | Lin et al. |
| 6,882,461 B1 | 4/2005 | Tsai et al. |
| 6,905,621 B2 | 6/2005 | Ho et al. |
| 6,906,847 B2 | 6/2005 | Huibers et al. |
| 6,912,022 B2 | 6/2005 | Lin et al. |
| 6,940,631 B2 | 9/2005 | Ishikawa |
| 6,952,303 B2 | 10/2005 | Lin et al. |
| 6,952,304 B2 | 10/2005 | Mushika et al. |
| 6,958,847 B2 | 10/2005 | Lin |
| 6,980,350 B2 | 12/2005 | Hung et al. |
| 6,982,820 B2 | 1/2006 | Tsai |
| 6,995,890 B2 | 2/2006 | Lin |
| 6,999,225 B2 | 2/2006 | Lin |
| 6,999,236 B2 | 2/2006 | Lin |
| 7,016,099 B2 | 3/2006 | Ikeda et al. |
| 7,078,293 B2 | 7/2006 | Lin et al. |
| 7,110,158 B2 | 9/2006 | Miles |
| 7,123,216 B1 | 10/2006 | Miles |
| 7,172,915 B2 | 2/2007 | Lin et al. |
| 7,250,315 B2 | 7/2007 | Miles |
| 2001/0003487 A1 | 6/2001 | Miles |
| 2001/0010953 A1 | 8/2001 | Kang et al. |
| 2001/0026951 A1 | 10/2001 | Vergani et al. |
| 2001/0040649 A1 | 11/2001 | Ozaki |
| 2001/0040675 A1 | 11/2001 | True et al. |
| 2001/0055208 A1 | 12/2001 | Kimura |
| 2002/0015215 A1 | 2/2002 | Miles |
| 2002/0021485 A1 | 2/2002 | Pilossof |
| 2002/0024711 A1 | 2/2002 | Miles |
| 2002/0031155 A1 | 3/2002 | Tayebati et al. |
| 2002/0036304 A1 | 3/2002 | Ehmke et al. |
| 2002/0054424 A1 | 5/2002 | Miles |
| 2002/0055253 A1 | 5/2002 | Rudhard |
| 2002/0058422 A1 | 5/2002 | Jang et al. |
| 2002/0071169 A1 | 6/2002 | Bowers et al. |
| 2002/0075555 A1 | 6/2002 | Miles |
| 2002/0086455 A1 | 7/2002 | Franosch et al. |
| 2002/0109899 A1 | 8/2002 | Ohtaka et al. |
| 2002/0110948 A1 | 8/2002 | Huang et al. |
| 2002/0126364 A1 | 9/2002 | Miles |
| 2002/0131682 A1 | 9/2002 | Nasiri et al. |
| 2002/0135857 A1 | 9/2002 | Fitzpatrick et al. |
| 2002/0137072 A1 | 9/2002 | Mirkin et al. |
| 2002/0149828 A1 | 10/2002 | Miles |
| 2002/0167072 A1 | 11/2002 | Andosca |
| 2002/0168136 A1 | 11/2002 | Atia et al. |
| 2002/0195681 A1 | 12/2002 | Melendez et al. |
| 2003/0006468 A1 | 1/2003 | Ma et al. |
| 2003/0007107 A1 | 1/2003 | Chae et al. |
| 2003/0021004 A1 | 1/2003 | Cunningham et al. |
| 2003/0043157 A1 | 3/2003 | Miles |
| 2003/0054588 A1 | 3/2003 | Patel et al. |
| 2003/0062186 A1 | 4/2003 | Boroson et al. |
| 2003/0072070 A1 | 4/2003 | Miles |
| 2003/0077843 A1 | 4/2003 | Yamauchi et al. |
| 2003/0090350 A1 | 5/2003 | Feng et al. |
| 2003/0102771 A1 | 6/2003 | Akiba et al. |
| 2003/0112096 A1 | 6/2003 | Potter |
| 2003/0132822 A1 | 7/2003 | Ko et al. |
| 2003/0138213 A1 | 7/2003 | Jiin et al. |
| 2003/0152872 A1 | 8/2003 | Miles |
| 2003/0201784 A1 | 10/2003 | Potter |
| 2003/0202264 A1 | 10/2003 | Weber et al. |
| 2003/0202265 A1 | 10/2003 | Reboa et al. |
| 2003/0202266 A1 | 10/2003 | Ring et al. |
| 2003/0231373 A1 | 12/2003 | Kowarz et al. |
| 2004/0010115 A1 | 1/2004 | Sotzing |
| 2004/0027636 A1 | 2/2004 | Miles |
| 2004/0027701 A1 | 2/2004 | Ishikawa |
| 2004/0028849 A1 | 2/2004 | Stark et al. |
| 2004/0035821 A1 | 2/2004 | Doan et al. |
| 2004/0051929 A1 | 3/2004 | Sampsell et al. |
| 2004/0053434 A1 | 3/2004 | Bruner |
| 2004/0058531 A1 | 3/2004 | Hsieh et al. |
| 2004/0058532 A1 | 3/2004 | Miles et al. |
| 2004/0061543 A1 | 4/2004 | Nam et al. |
| 2004/0063322 A1 | 4/2004 | Yang |
| 2004/0080807 A1 | 4/2004 | Chen et al. |
| 2004/0080832 A1 | 4/2004 | Singh |
| 2004/0087086 A1 | 5/2004 | Lee |
| 2004/0100677 A1 | 5/2004 | Huibers et al. |
| 2004/0124073 A1 | 7/2004 | Pilans et al. |
| 2004/0125281 A1 | 7/2004 | Lin et al. |
| 2004/0125282 A1 | 7/2004 | Lin et al. |
| 2004/0125536 A1 | 7/2004 | Arney et al. |
| 2004/0136076 A1 | 7/2004 | Parviz |
| 2004/0145049 A1 | 7/2004 | McKinnell et al. |
| 2004/0145811 A1 | 7/2004 | Lin et al. |
| 2004/0147056 A1 | 7/2004 | McKinnell et al. |
| 2004/0147198 A1 | 7/2004 | Lin et al. |
| 2004/0148009 A1 | 7/2004 | Buzzard |
| 2004/0150869 A1 | 8/2004 | Kasai |
| 2004/0160143 A1 | 8/2004 | Shreeve et al. |
| 2004/0174583 A1 | 9/2004 | Chen et al. |
| 2004/0175577 A1 | 9/2004 | Lin et al. |
| 2004/0179281 A1 | 9/2004 | Reboa |
| 2004/0179445 A1 | 9/2004 | Park |
| 2004/0191937 A1 | 9/2004 | Patel et al. |
| 2004/0191946 A1 | 9/2004 | Patel et al. |
| 2004/0207897 A1 | 10/2004 | Lin |
| 2004/0209192 A1 | 10/2004 | Lin et al. |
| 2004/0209195 A1 | 10/2004 | Lin |
| 2004/0212026 A1 | 10/2004 | Van Brocklin et al. |
| 2004/0217378 A1 | 11/2004 | Martin et al. |
| 2004/0217919 A1 | 11/2004 | Pichl et al. |
| 2004/0218251 A1 | 11/2004 | Piehl et al. |
| 2004/0218334 A1 | 11/2004 | Martin et al. |
| 2004/0218341 A1 | 11/2004 | Martin et al. |
| 2004/0227493 A1 | 11/2004 | Van Brocklin et al. |
| 2004/0240027 A1 | 12/2004 | Lin et al. |
| 2004/0240032 A1 | 12/2004 | Miles |
| 2004/0240138 A1 | 12/2004 | Martin et al. |
| 2004/0245588 A1 | 12/2004 | Nikkel et al. |
| 2004/0263944 A1 | 12/2004 | Miles et al. |
| 2005/0001828 A1 | 1/2005 | Martin et al. |
| 2005/0003667 A1 | 1/2005 | Lin et al. |
| 2005/0012577 A1 | 1/2005 | Pillans et al. |
| 2005/0012975 A1 | 1/2005 | George et al. |
| 2005/0020089 A1 | 1/2005 | Shi et al. |
| 2005/0024557 A1 | 2/2005 | Lin |
| 2005/0035699 A1 | 2/2005 | Tsai |
| 2005/0036095 A1 | 2/2005 | Yeh et al. |
| 2005/0036192 A1 | 2/2005 | Lin et al. |
| 2005/0038950 A1 | 2/2005 | Adelmann |
| 2005/0042117 A1 | 2/2005 | Lin |
| 2005/0046919 A1 | 3/2005 | Taguchi et al. |
| 2005/0046922 A1 | 3/2005 | Lin et al. |
| 2005/0046948 A1 | 3/2005 | Lin |
| 2005/0057442 A1 | 3/2005 | Way |

| | | | |
|---|---|---|---|
| 2005/0068583 A1 | 3/2005 | Gutkowski et al. | |
| 2005/0068605 A1 | 3/2005 | Tsai | |
| 2005/0068606 A1 | 3/2005 | Tsai | |
| 2005/0069209 A1 | 3/2005 | Damera-Venkata et al. | |
| 2005/0078348 A1 | 4/2005 | Lin | |
| 2005/0128565 A1 | 6/2005 | Ljungblad | |
| 2005/0168849 A1 | 8/2005 | Lin | |
| 2005/0195462 A1 | 9/2005 | Lin | |
| 2005/0195467 A1 | 9/2005 | Kothari et al. | |
| 2005/0202649 A1 | 9/2005 | Hung et al. | |
| 2005/0249966 A1 | 11/2005 | Tung et al. | |
| 2006/0024880 A1 | 2/2006 | Chui et al. | |
| 2006/0050393 A1 | 3/2006 | Lin et al. | |
| 2006/0066932 A1 | 3/2006 | Chui et al. | |
| 2006/0066935 A1 | 3/2006 | Cummings et al. | |
| 2006/0261330 A1 | 11/2006 | Miles | |
| 2007/0121205 A1 | 5/2007 | Miles | |

FOREIGN PATENT DOCUMENTS

| | | |
|---|---|---|
| CN | 092109265 | 11/2003 |
| DE | 10228946 A1 | 1/2004 |
| EP | 0173808 | 3/1986 |
| EP | 0 667 548 A1 | 8/1995 |
| EP | 0694801 A | 1/1996 |
| EP | 0695959 A | 2/1996 |
| EP | 0878824 A2 | 11/1998 |
| EP | 1197778 A | 4/2002 |
| EP | 1 243 550 | 9/2002 |
| EP | 1258860 A1 | 11/2002 |
| EP | 1 452 481 A | 9/2004 |
| JP | 405275401 A | 10/1993 |
| JP | 6-281956 | 10/1994 |
| JP | 7-45550 | 2/1995 |
| JP | 09-036387 | 2/1997 |
| JP | 10500224 | 1/1998 |
| JP | 10-116996 | 5/1998 |
| JP | 10-148644 | 6/1998 |
| JP | 10-267658 | 10/1998 |
| JP | 11211999 A | 8/1999 |
| JP | 11-263012 | 9/1999 |
| JP | 11243214 | 9/1999 |
| JP | 2000-40831 A | 2/2000 |
| JP | 2002 062493 | 2/2002 |
| JP | 2002-270575 | 9/2002 |
| JP | 2002-296521 | 10/2002 |
| JP | 2002-341267 | 11/2002 |
| JP | 2002-355800 | 12/2002 |
| JP | 2003001598 A | 1/2003 |
| JP | 2003-057571 | 2/2003 |
| JP | 2004-102022 A | 4/2004 |
| JP | 2004106074 A | 4/2004 |
| JP | 2004-212656 | 7/2004 |
| JP | 2005051007 A | 2/2005 |
| KR | 2002-9270 | 10/1999 |
| KR | 2000-0033006 | 6/2000 |
| WO | WO 92/10925 | 6/1992 |
| WO | WO9717628 | 5/1997 |
| WO | WO9952006 A2 | 10/1999 |
| WO | WO9952006 A3 | 10/1999 |
| WO | WO0114248 | 3/2001 |
| WO | WO 02/24570 A | 3/2002 |
| WO | WO03007049 A1 | 1/2003 |
| WO | WO 03/052506 | 6/2003 |
| WO | WO 03/069413 A | 8/2003 |
| WO | WO03069413 A1 | 8/2003 |
| WO | WO03073151 A1 | 9/2003 |
| WO | WO2004006003 A1 | 1/2004 |
| WO | WO2004026757 A2 | 4/2004 |
| WO | WO 2004-079056 A2 | 9/2004 |
| WO | WO 2005/019899 A1 | 3/2005 |
| WO | WO 2005/085932 A | 9/2005 |
| WO | WO 2005/124869 | 12/2005 |
| WO | WO 2006/036385 | 4/2006 |
| WO | WO 2006/036437 | 4/2006 |
| WO | WO2006/036542 | 4/2006 |

OTHER PUBLICATIONS

Austrian Search Report dated May 4, 2005.
Austrian Search Report dated Aug. 12, 2005.
Aratani et al., "Surface micromachined tuneable interferometer array," Sensors and Actuators, pp. 17-23. (1994).
Conner, "Hybrid Color Display Using Optical Interference Filter Array," SID Digest, pp. 577-580 (1993).
EP 05255661.0 European Search Report (Dec. 30, 2005).
Fan et al., "Channel Drop Filters in Photonic Crystals," Optics Express, vol. 3, No. 1 (1998).
Giles et al., "A Silicon MEMS Optical Switch Attenuator and Its Use in Lightwave Subsystems," IEEE Journal of Selected Topics in Quanum Electronics, vol. 5, No. 1, pp. 18-25, (Jan./Feb. 1999).
Goossen et al., "Possible Display Applications of the Silicon Mechanical Anti-Reflection Switch," Society for Information Display (1994).
Goossen et al., "Silicon Modulator Based on Mechanically-Active Anti-Reflection Layer with IMbit/sec Capability for Fiber-in-the-Loop Applications," IEEE Photonics Technology Letters, pp. 1119, 1121 (Sep. 1994).
Goossen K.W., "MEMS-Based Variable Optical Interference Devices", Optical MEMS, 2000 IEEE/Leos International Conference on Aug. 21-24, 2000, Piscataway, NJ, USA, IEE, Aug. 21, 2000, pp. 17-18.
Gosch, "West Germany Grabs the Lead in X-Ray Lithography," Electronics pp. 78-80 (Feb. 5, 1987).
Harnett et al., "Heat-depolymerizable polycarbonates as electron beam patternable sacrificial layers for nanofluidics," J. Vac. Sci. Technol. B 19(6), (Nov./Dec. 2001), pp. 2842-2845.
Howard et al., "Nanometer-Scale Fabrication Techniques," VLSI Electronics: Microstructure Science, vol. 5, pp. 145-153 and pp. 166-173 (1982).
Ibbotson et al., "Comparison of XeF2 and F-atom reactions with Si and SiO2," Applied Physics Letters, vol. 44, No. 12, pp. 1129-1131 (Jun. 1984).
Jackson "Classical Electrodynamics," John Wiley & Sons Inc., pp. 568-573. (date unknown).
Jerman et al., "A Miniature Fabry-Perot Interferometer with a Corrugated Silicon Diaphragm Support," (1988).
Joannopoulos et al., "Photonic Crystals: Molding the Flow of Light," Princeton University Press (1995).
Johnson, "Optical Scanners," Microwave Scanning Antennas, vol. 1, pp. 251-261, (1964).
Kim et al., "Control of Optical Transmission Through Metals Perforated With Subwavelength Hole Arrays," Optic Letters, vol. 24, No. 4, pp. 256-257, (Feb. 1999).
Lee et al., "Electrostatic Actuation of Surface/Bulk Micromachined Single-Crystal Silicon Microresonators", International Conference on Intelligent Robots and Systems, vol. 2, pp. 1057-1062, (Oct. 17-21, 1999).
Lee et al., "The Surface/Bulk Micromachining (SBM) Process: a New Method for Fabricating Released MEMS in Single Crystal Silicon", Journal of Microelectromechanical Systems, vol. 8, Issue 4, pp. 409-416, (Dec. 1999).
Light over Matter, Circle No. 36 (Jun. 1993).
Lin et al., "Free-Space Micromachined Optical Switches for Optical Networking," IEEE Journal of Selected Topics in Quantum Electronics, vol. 5, No. 1, pp. 4-9. (Jan./Feb. 1999).
Little et al., "Vertically Coupled Microring Resonator Channel Dropping Filter," IEEE Photonics Technology Letters, vol. 11, No. 2, (1999).
Magel, "Integrated Optic Devices Using Micromachined Metal Membranes," SPIE vol. 2686, 0-8194-2060-Mar. 1996.
Miles, Mark, W., "A New Reflective FPD Technology Using Interferometric Modulation," The Proceedings of the Society for Information Display (May 11-16, 1997).

Nagami et al., "Plastic Cell Architecture: Towards Reconfigurable Computing For General-Purpose," IEEE, 0-8186-8900-, pp. 68-77, (May 1998).
Newsbreaks, "Quantum-trench devices might operate at terahertz frequencies," Laser Focus World (May 1993).
Oliner et al., "Radiating Elements and Mutual Coupling," Microwave Scanning Antennas, vol. 2, pp. 131-141, (1966).
PCT/US02/13442, Search Report Sep. 13, 2002.
PCT/US04/20330 Search Report Nov. 8, 2004.
PCT/US05/030927 International Search Report (0125/2006).
PCT/US05/031693 International Search Report.
PCT/US05/032331 International Search Report (Apr. 7, 2006).
PCT/US05/033558 Partial International Search Report (Feb. 24, 2006).
PCT/US2004/035820 International Search Report and Written Opinion (Apr. 11, 2005).
PCT/US96/17731 Search Report.
Raley et al., "A Fabry-Perot Microinterferometer for Visible Wavelengths," IEEE Solid-State Sensor and Actuator Workshop, Jun. 1992, Hilton Head, SC.
Schnakenberg et al., "TMAHW Etchants for Silicon Micromachining," 1991 International Conference on Solid State Sensors and Actuators-Digest of Technical Papers, pp. 815-818 (1991).
Sperger et al., "High Performance Patterned All-Dielectric Interference Colour Filter for Display Applications," SID Digest, pp. 81-83, (1994).
Sridharan et al. "Post-Packaging Release a New Concept for Surface-Micromachined Devices" Technical Digest IEEE Solid-State Sensor & Actuator Workshop, New York, NY, US, Nov. 8, 1998, pp. 225-228, XP000992464.
Stone, "Radiation and Optics, An Introduction to the Classical Theory," McGraw-Hill, pp. 340-343, (1963).
Walker et al., "Electron-beam-tunable Interference Filter Spatial Light Modulator," Optics Letters vol. 13, No. 5, pp. 345-347, (May 1988).
Williams et al., "Etch Rates for Micromachining Processing," Journal of Microelectromechanical Systems, vol. 5, No. 4, pp. 256-259 (Dec. 1996).
Winters et al., "The etching of silicon with XeF2 vapor. Applied Physics Letters," vol. 34, No. 1, pp. 70-73 (Jan. 1979).
Winton, "A novel way to capture solar energy," Chemical Week, (May 1985).
Wu, "Design of a Reflective Color LCD Using Optical Interference Reflectors," ASIA Display '95, pp. 929-931, (Oct. 1995).
Zhou et al., "Waveguide Panel Display Using Electromechanical Spatial Modulators" SID Digest, vol. XXIX, (1998).
RCO Pt Pub 157313, May 1, 1991, FSI International.
Austrian Search Report for EX72/2005 dated May 13, 2005.
Austrian Search Report for EX81/2005 dated May 18, 2005.
Austrian Search Report for EX170/2005 dated Jul. 6, 2005.
Austrian Search Report for EX139/2005 dated Jul. 27, 2005.
Austrian Search Report for EX144/2005 dated Aug. 11, 2005.
Bains, "Digital Paper Display Technology Holds Promise For Portables," CommsDesign EE Times (2000).
Bass, Handbook of Optics, vol. 1, Fundamentals, Techniques, and Design, Second Edition, McGraw-Hill, inc New York pp. 2.29/2.36 (1995).
Chu, et al. "Formation and Microstructures of Anodic Aluminoa Films from Aluminum Sputtered onglass Substrate" Journal of the Electrochemical Society, 149 (7) B321-B327 (2002).
Crouse, "Self-ordered pore structure of anodized aluminum on silicon and pattern transfer" Applied Physics Letters, vol. 76, No. 1, Jan. 3, 2000. pp. 49-51.
French, P.J. "Development of Surface Micromachining techniques compatable with on-chip electronics" Journal of Micromechanics and Microengineering vol. 6 No. 2, 197-211 XP 002360789 (Jun. 1996) IOP Publishing.
Furneaux, et al. "The Formation of Controlled-porosity membranes from Anodically Oxidized Aluminium" Nature vo 337 Jan. 12, 1989, pp. 147-149.
Jerman J. H. et al., "Maniature Fabry-Perot Interferometers Micromachined in Silicon for Use in Optical Fiber WDM Systems," Transducers. San Francisco, Jun. 24-27, 1991, Proceedings of the International Conference on Solid State Sensors Andactuators, New Youk IEEE, US, vol. Conf. 6, Jun. 24, 1991.
Lieberman, "MEMS Display Looks to Give PDAs Sharper Image," EE Times (Feb. 11, 1997).
Lieberman, "Microbridges at Heart of New MEMS Displays," EE Times (Apr. 24, 1997).
Maboudian, et al. Critical Review: Adhesion in Surface Micromechanical Structures: J. Vac. Sci Techno. B 15(1) Jan./Feb. 1997, pp. 1-20.
MICROCHEM, LOR Lift-Off Resists Datasheet, 2002.
Miles, "Interferometric Modulation: MOEMS as an Enabling Technology for High-Performance Reflective Displays," Proceedings of the International Society for Optical Engineering, San Jose, CA, vol. 49085, pp. 131-139 (Jan. 28, 2003).
Miles, et al., "10.1: Digital Paper for Reflective Displays," 2002 SID International Symposium Digest of Technical Papers, Boston, MA, SID International Symposium Digest of Technical Papers, San Jose, CA, vol. 33 / 1, pp. 115-117 (May 21-23, 2002).
Penta Vacuum MEMS Etcher Specifications, http://www.pentavacuum.com/memes.htm.
Science and Technology, The Economist, pp. 89-90, (May 1999).
Search Report PCT/US05/031237 (Dec. 29, 2005).
Search Report PCT/US05/030033 and Written Opinion.
Search Report PCT/US05/030902.
Search Report and Written Opinion for PCT/US05/33558 (May 19, 2005).
Search Report PCT/US05/032331 (Apr. 7, 2006).
Search Report PCT/US05/032331 (Jan. 9, 2006).
Search Report and Written Opinion for PCT/US05/032647.
Tayebi et al. "Reducing the Effects of adhesion and friction in microelectomechanical systesm (MEMS) through surface roughening: Comparison Between theory and experiments" http://jap.ajp.org/jap/copyright.isp Journal of applied Physics 98, 073528 (2005).
Thin Film Transistors- Materials and Processes—vol. 1 Amorphous Silicon Thin Film Transistors ed. Yue Kuo, Kluwer Academic Publishers, Boston (2004).
Xactix Xetch X Specifications, http://xactix.com/Xtech X3specs.htm. Jan. 5, 2005.
Xactix Xetch Product Information.
PCT International Search Report (PCT/US2005/029821).
Aratani, et al., "Process and Design Considerations for Surface Micromachined Beams for a Tuneable Interferometer Array in Silicon", 0-7803-0957-2/93, IEEE, 1993, pp. 230-235.
Official Communication dated Oct. 16, 2007 in European App. No. 05788602.0.
IPRP for PCT/US2005/029821 filed Aug. 22, 2005.
Kawamura et al., Fabrication of fine metal microstructures packaged in the bonded glass substrates, Proceedings of SPIE, vol. 3893, pp. 486-493, 1999.

* cited by examiner

|  | Column Output Signals | |
|---|---|---|
|  | $+V_{bias}$ | $-V_{bias}$ |
| Row Output Signals  0 | Stable | Stable |
| $+\Delta V$ | Relax | Actuate |
| $-\Delta V$ | Actuate | Relax |

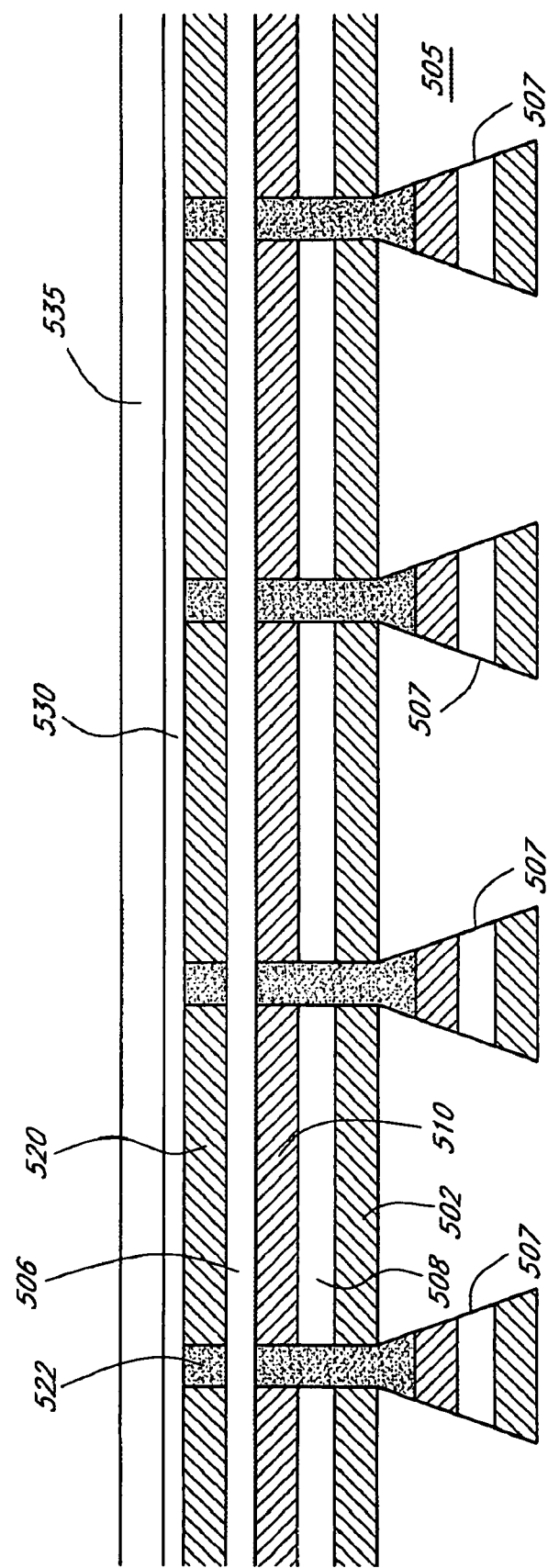

US 7,373,026 B2

MEMS DEVICE FABRICATED ON A PRE-PATTERNED SUBSTRATE

RELATED APPLICATIONS

This application claims priority to U.S. Provisional Application No. 60/613,376, filed Sep. 27, 2004. The content of the aforementioned application is hereby incorporated by reference in its entirety.

BACKGROUND

Field

The field of the invention relates to microelectromechanical systems (MEMS) and the packaging of such systems. More specifically, the field of the invention relates to interferometric modulators and methods of fabricating such interferometric modulators on a pre-patterned substrate.

DESCRIPTION OF THE RELATED TECHNOLOGY

Microelectromechanical systems (MEMS) include micro mechanical elements, actuators, and electronics. Micromechanical elements may be created using deposition, etching, and or other micromachining processes that etch away parts of substrates and/or deposited material layers or that add layers to form electrical and electromechanical devices. One type of MEMS device is called an interferometric modulator. As used herein, the term interferometric modulator or interferometric light modulator refers to a device that selectively absorbs and/or reflects light using the principles of optical interference. In certain embodiments, an interferometric modulator may comprise a pair of conductive plates, one or both of which may be transparent and/or reflective in whole or part and capable of relative motion upon application of an appropriate electrical signal. In a particular embodiment, one plate may comprise a stationary layer deposited on a substrate and the other plate may comprise a metallic membrane separated from the stationary layer by an air gap or cavity. As described herein in more detail, the position of one plate in relation to another can change the optical interference of light incident on the interferometric modulator. Such devices have a wide range of applications, and it would be beneficial in the art to utilize and/or modify the characteristics of these types of devices so that their features can be exploited in improving existing products and creating new products that have not yet been developed.

SUMMARY OF CERTAIN EMBODIMENTS

The system, method, and devices of the invention each have several aspects, no single one of which is solely responsible for its desirable attributes. Without limiting the scope of this invention, its more prominent features will now be discussed briefly. After considering this discussion, and particularly after reading the section entitled "Detailed Description of Certain Embodiments" one will understand how the features of this invention provide advantages over other display devices. The embodiments described herein provide a package structure and a method of manufacturing a package structure in ambient conditions.

An embodiment provides a method of making a microelectromechanical systems device. A substrate having a plurality of trenches is provided. At least one layer is deposited over the substrate, wherein the layer is discontinuous at the trenches. A first cavity is created between a first electrode formed over the substrate and a second electrode, wherein the at least one layer comprises the first electrode.

According to another embodiment, a display device is provided, comprising a substrate having a plurality of grooves formed therein, a first electrode formed over a top surface of the substrate and a second electrode, a semi-reflective layer, and a transparent material formed over the chromium layer. The first electrode and the second electrode are insulated from each other and separated by a first cavity. The semi-reflective layer separated from the second electrode by a second cavity.

According to yet another embodiment, a method of forming a microelectromechanical systems device is provided. A substrate having a top surface is provided, wherein a plurality of grooves is formed in the top surface. At least one layer is deposited over the substrate, wherein the at least one layer comprises a first conductive material and is discontinuous at the grooves forming rows of the layer on the top surface. A second conductive material is deposited, wherein the second conductive material is oriented orthogonally to the first conductive material on the top surface.

In accordance with another embodiment, a display device is provided. The display device comprises a substrate having a plurality of grooves formed therein, a first reflecting means for reflecting light formed over a top surface of the substrate and a second reflecting means for reflecting light, a semi-reflective layer separated from the second reflecting means by a second cavity, and a viewing means for transmitting light. The first reflecting means and the second reflecting means are insulated from each other and separated by a first cavity, and the viewing means formed over the semi-reflective layer.

BRIEF DESCRIPTION OF THE DRAWINGS

These and other aspects of the invention will be readily apparent from the following description and from the appended drawings (not to scale), which are meant to illustrate and not to limit the invention, and wherein:

FIGS. 8A-8C are cross-sections of an interferometric modulator formed o n a pre-patterned substrate, in accordance with an embodiment.

DETAILED DESCRIPTION OF CERTAIN EMBODIMENTS

The following detailed description is directed to certain specific embodiments of the invention. However, the invention can be embodied in a multitude of different ways. In this description, reference is made to the drawings wherein like parts are designated with like numerals throughout. As will be apparent from the following description, the embodiments may be implemented in any device that is configured to display an image, whether in motion (e.g., video) or stationary (e.g., still image), and whether textual or pictorial. More particularly, it is contemplated that the embodiments may be implemented in or associated with a variety of electronic devices such as, but not limited to, mobile telephones, wireless devices, personal data assistants (PDAs), hand-held or portable computers, GPS receivers/navigators, cameras, MP3 players, camcorders, game consoles, wrist watches, clocks, calculators, television monitors, flat panel displays, computer monitors, auto displays (e.g., odometer display, etc.), cockpit controls and/or displays, display of camera views (e.g., display of a rear view camera in a vehicle), electronic photographs, electronic billboards or signs, projectors, architectural structures, packaging, and aesthetic structures (e.g., display of images on a piece of jewelry). MEMS devices of similar structure to those described herein can also be used in non-display applications such as in electronic switching devices.

Figure 1:
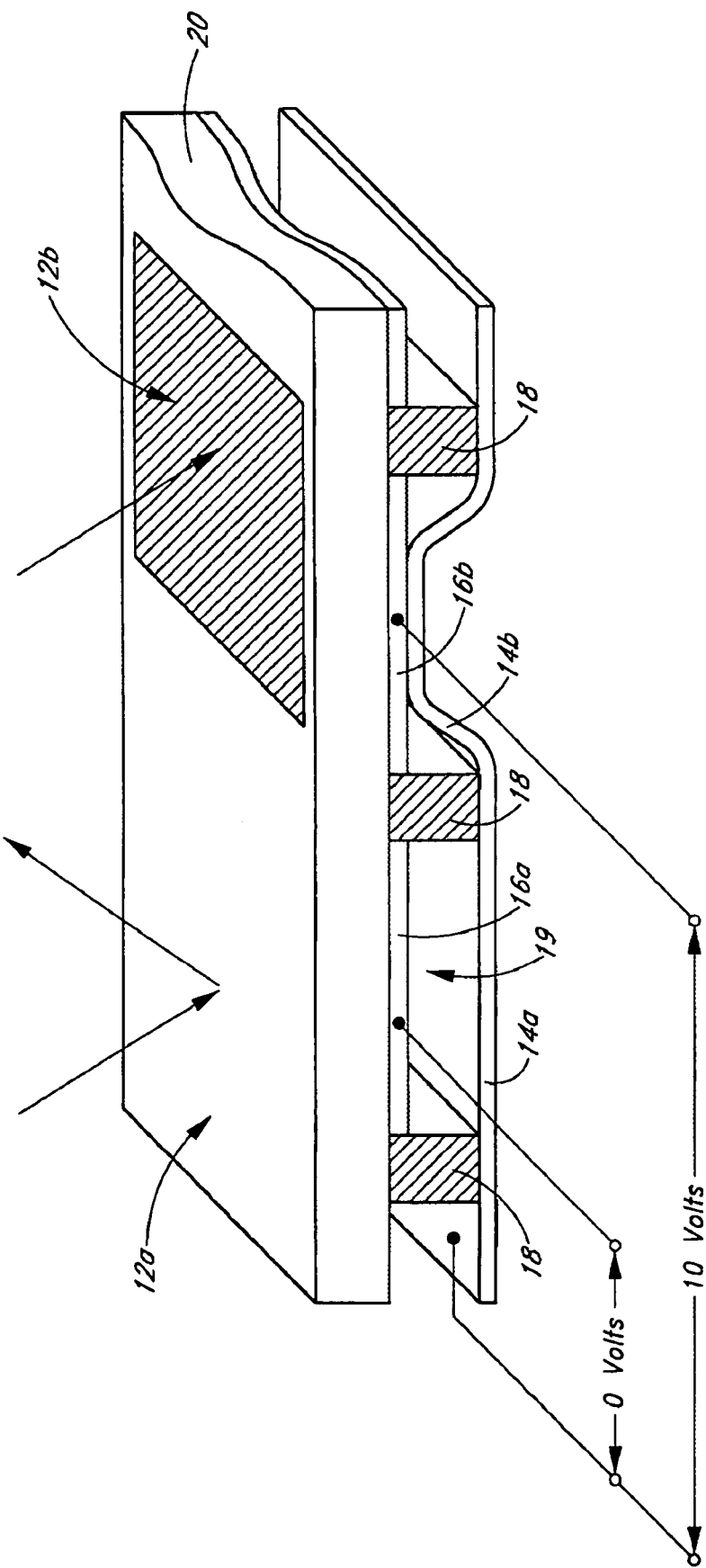
FIG. 1 is an isometric view depicting a portion of one embodiment of an interferometric modulator display in which a movable reflective layer of a first interferometric modulator is in a relaxed position and a movable reflective layer of a second interferometric modulator is in an actuated position.

One interferometric modulator display embodiment comprising an interferometric MEMS display element is illustrated in FIG. 1. In these devices, the pixels are in either a bright or dark state. In the bright ("on" or "open") state, the display element reflects a large portion of incident visible light to a user. When in the dark ("off" or "closed") state, the display element reflects little incident visible light to the user. Depending on the embodiment, the light reflectance properties of the "on" and "off" states may be reversed. MEMS pixels can be configured to reflect predominantly at selected colors, allowing for a color display in addition to black and white.

FIG. 1 is an isometric view depicting two adjacent pixels in a series of pixels of a visual display, wherein each pixel comprises a MEMS interferometric modulator. In some embodiments, an interferometric modulator display comprises a row/column array of these interferometric modulators. Each interferometric modulator includes a pair of reflective layers positioned at a variable and controllable distance from each other to form a resonant optical cavity with at least one variable dimension. In one embodiment, one of the reflective layers may be moved between two positions. In the first position, referred to herein as the relaxed position, the movable reflective layer is positioned at a relatively large distance from a fixed partially reflective layer. In the second position, referred to herein as the actuated position, the movable reflective layer is positioned more closely adjacent to the partially reflective layer. Incident light that reflects from the two layers interferes constructively or destructively depending on the position of the movable reflective layer, producing either an overall reflective or non-reflective state for each pixel.

The depicted portion of the pixel array in FIG. 1 includes two adjacent interferometric modulators 12a and 12b. In the interferometric modulator 12a on the left, a movable reflective layer 14a is illustrated in a relaxed position at a predetermined distance from an optical stack 16a, which includes a partially reflective layer. In the interferometric modulator 12b on the right, the movable reflective layer 14b is illustrated in an actuated position adjacent to the optical stack 16b.

The optical stacks 16a and 16b (collectively referred to as optical stack 16), as referenced herein, typically comprise of several fused layers, which can include an electrode layer, such as indium tin oxide (ITO), a partially reflective layer, such as chromium, and a transparent dielectric. The optical stack 16 is thus electrically conductive, partially transparent and partially reflective, and may be fabricated, for example, by depositing one or more of the above layers onto a transparent substrate 20. In some embodiments, the layers are patterned into parallel strips, and may form row electrodes in a display device as described further below. The movable reflective layers 14a, 14b may be formed as a series of parallel strips of a deposited metal layer or layers (orthogonal to the row electrodes of 16a, 16b) deposited on top of posts 18 and an intervening sacrificial material deposited between the posts 18. When the sacrificial material is etched away, the movable reflective layers 14a, 14b are separated from the optical stacks 16a, 16b by a defined gap 19. A highly conductive and reflective material such as aluminum may be used for the reflective layers 14, and these strips may form column electrodes in a display device.

With no applied voltage, the cavity 19 remains between the movable reflective layer 14a and optical stack 16a, with the movable reflective layer 14a in a mechanically relaxed state, as illustrated by the pixel 12a in FIG. 1. However, when a potential difference is applied to a selected row and column, the capacitor formed at the intersection of the row and column electrodes at the corresponding pixel becomes charged, and electrostatic forces pull the electrodes together. If the voltage is high enough, the movable reflective layer 14 is deformed and is forced against the optical stack 16. A dielectric layer (not illustrated in this Figure) within the optical stack 16 may prevent shorting and control the separation distance between layers 14 and 16, as illustrated by pixel 12b on the right in FIG. 1. The behavior is the same regardless of the polarity of the applied potential difference. In this way, row/column actuation that can control the reflective vs. non-reflective pixel states is analogous in many ways to that used in conventional LCD and other display technologies.

FIGS. 2 through 5 illustrate one exemplary process and system for using an array of interferometric modulators in a display application.

Figure 2:
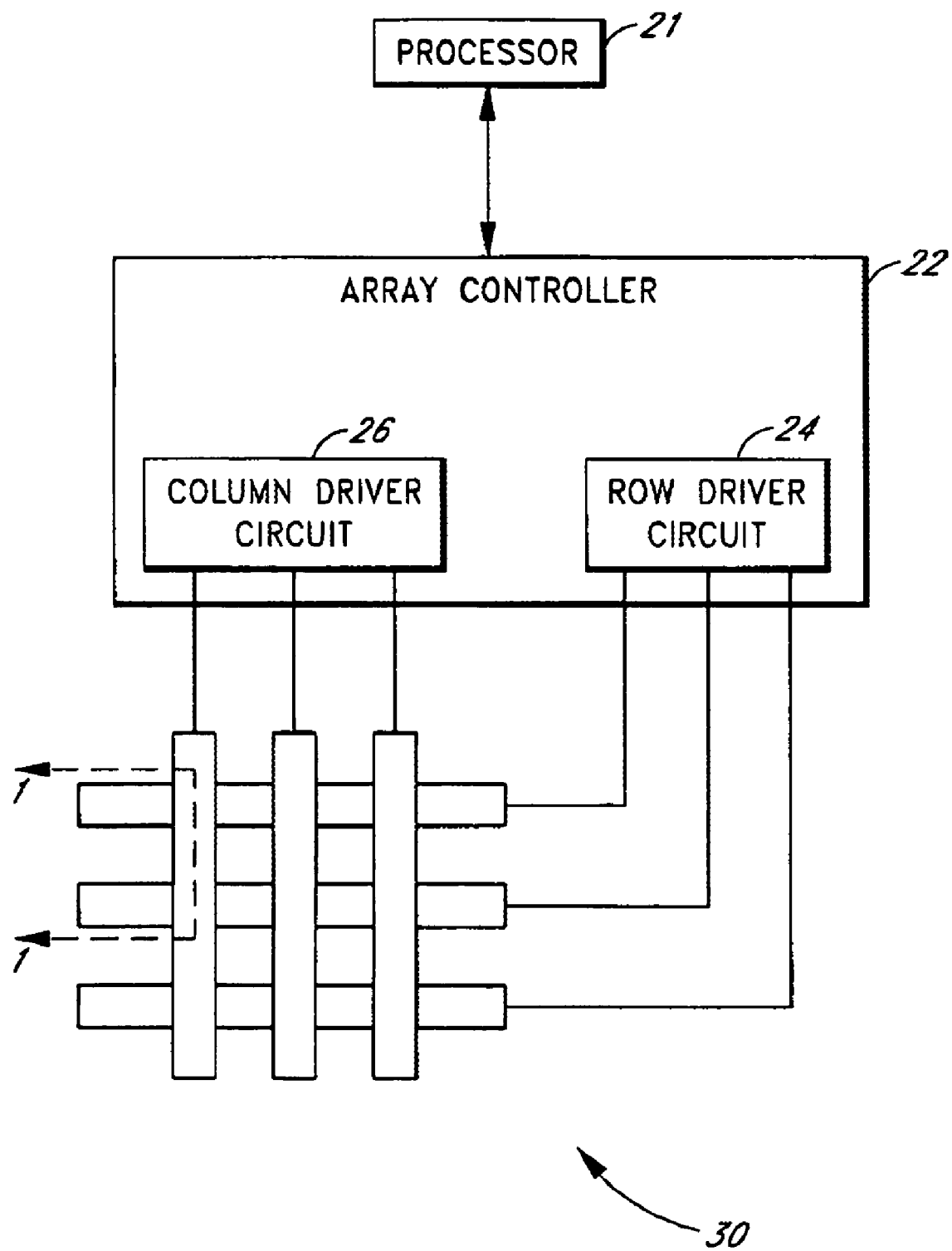
FIG. 2 is a system block diagram illustrating one embodiment of an electronic device incorporating a 3×3 interferometric modulator display.

FIG. 2 is a system block diagram illustrating one embodiment of an electronic device that may incorporate aspects of the invention. In the exemplary embodiment, the electronic device includes a processor 21 which may be any general purpose single- or multi-chip microprocessor such as an ARM, Pentium®, Pentium II®, Pentium III®, Pentium IV®, Pentium® Pro, an 8051, a MIPS®, a Power PC®, an ALPHA®, or any special purpose microprocessor such as a digital signal processor, microcontroller, or a programmable gate array. As is conventional in the art, the processor 21 may be configured to execute one or more software modules. In addition to executing an operating system, the processor may be configured to execute one or more software applications, including a web browser, a telephone application, an email program, or any other software application.

In one embodiment, the processor 21 is also configured to communicate with an array driver 22. In one embodiment, the array driver 22 includes a row driver circuit 24 and a column driver circuit 26 that provide signals to a display array or panel 30. The cross section of the array illustrated in FIG. 1 is shown by the lines 1-1 in FIG. 2. For MEMS interferometric modulators, the row/column actuation protocol may take advantage of a hysteresis property of these devices illustrated in FIG. 3. It may require, for example, a 10 volt potential difference to cause a movable layer to deform from the relaxed state to the actuated state. However, when the voltage is reduced from that value, the movable layer maintains its state as the voltage drops back below 10 volts. In the exemplary embodiment of FIG. 3, the movable layer does not relax completely until the voltage drops below 2 volts. There is thus a range of voltage, about 3 to 7 V in the example illustrated in FIG. 3, where there exists a window of applied voltage within which the device is stable in either the relaxed or actuated state. This is referred to herein as the "hysteresis window" or "stability window." For a display array having the hysteresis characteristics of FIG. 3, the row/column actuation protocol can be designed such that during row strobing, pixels in the strobed row that are to be actuated are exposed to a voltage difference of about 10 volts, and pixels that are to be relaxed are exposed to a voltage difference of close to zero volts. After the strobe, the pixels are exposed to a steady state voltage difference of about 5 volts such that they remain in whatever state the row strobe put them in. After being written, each pixel sees a potential difference within the "stability window" of 3-7 volts in this example. This feature makes the pixel design illustrated in FIG. 1 stable under the same applied voltage conditions in either an actuated or relaxed pre-existing state. Since each pixel of the interferometric modulator, whether in the actuated or relaxed state, is essentially a capacitor formed by the fixed and moving reflective layers, this stable state can be held at a voltage within the hysteresis window with almost no power dissipation. Essentially no current flows into the pixel if the applied potential is fixed.

In typical applications, a display frame may be created by asserting the set of column electrodes in accordance with the desired set of actuated pixels in the first row. A row pulse is then applied to the row 1 electrode, actuating the pixels corresponding to the asserted column lines. The asserted set of column electrodes is then changed to correspond to the desired set of actuated pixels in the second row. A pulse is then applied to the row 2 electrode, actuating the appropriate pixels in row 2 in accordance with the asserted column electrodes. The row 1 pixels are unaffected by the row 2 pulse, and remain in the state they were set to during the row 1 pulse. This may be repeated for the entire series of rows in a sequential fashion to produce the frame. Generally, the frames are refreshed and/or updated with new display data by continually repeating this process at some desired number of frames per second. A wide variety of protocols for driving row and column electrodes of pixel arrays to produce display frames are also well known and may be used in conjunction with the present invention.

Figures 3, 4:
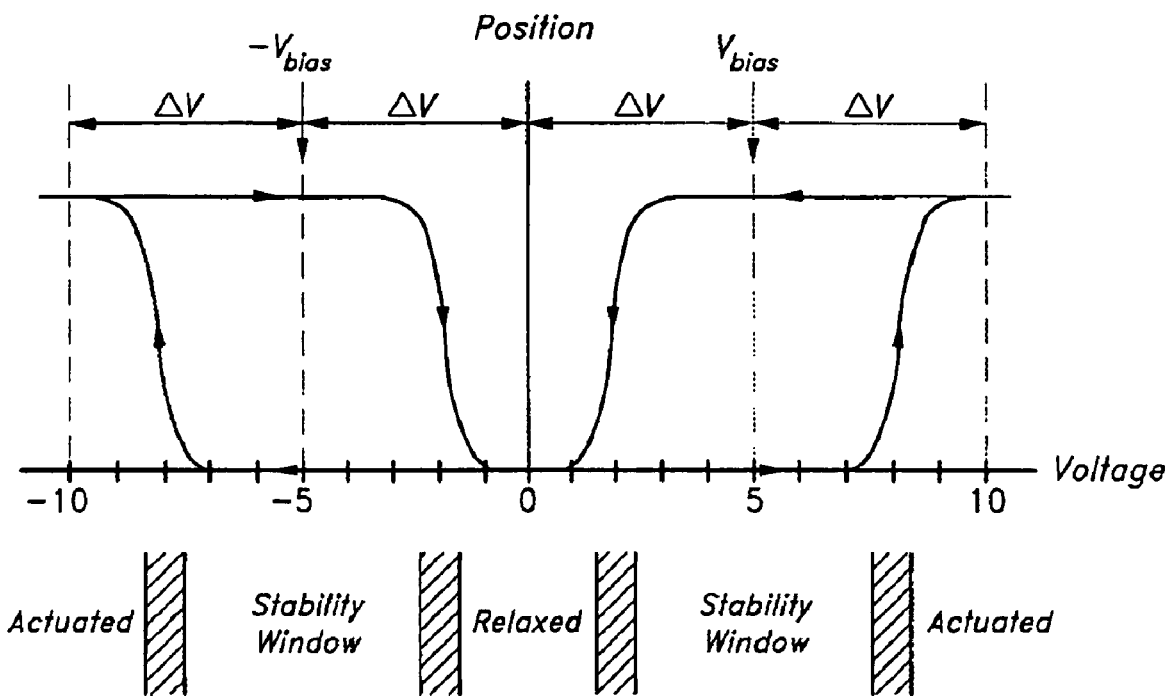
FIG. 3 is a diagram of movable mirror position versus applied voltage for one exemplary embodiment of an interferometric modulator of FIG. 1.
FIG. 4 is an illustration of a set of row and column voltages that may be used to drive an interferometric modulator display.

FIGS. 4 and 5 illustrate one possible actuation protocol for creating a display frame on the 3×3 array of FIG. 2. FIG. 4 illustrates a possible set of column and row voltage levels that may be used for pixels exhibiting the hysteresis curves of FIG. 3. In the FIG. 4 embodiment, actuating a pixel involves setting the appropriate column to $-V_{bias}$, and the appropriate row to $+\Delta V$, which may correspond to −5 volts and +5 volts respectively Relaxing the pixel is accomplished by setting the appropriate column to $+V_{bias}$, and the appropriate row to the same $+\Delta V$, producing a zero volt potential difference across the pixel. In those rows where the row voltage is held at zero volts, the pixels are stable in whatever state they were originally in, regardless of whether the column is at $+V_{bias}$, or $-V_{bias}$. As is also illustrated in FIG. 4, it will be appreciated that voltages of opposite polarity than those described above can be used, e.g., actuating a pixel can involve setting the appropriate column to $+V_{bias}$, and the appropriate row to $-\Delta V$. In this embodiment, releasing the pixel is accomplished by setting the appropriate column to $-V_{bias}$, and the appropriate row to the same $-\Delta V$, producing a zero volt potential difference across the pixel. As is also illustrated in FIG. 4, it will be appreciated that voltages of opposite polarity than those described above can be used, e.g., actuating a pixel can involve setting the appropriate column to $+V_{bias}$, and the appropriate row to $-\Delta V$. In this embodiment, releasing the pixel is accomplished by setting the appropriate column to $-V_{bias}$, and the appropriate row to the same $-\Delta V$, producing a zero volt potential difference across the pixel.

Figure 5A:
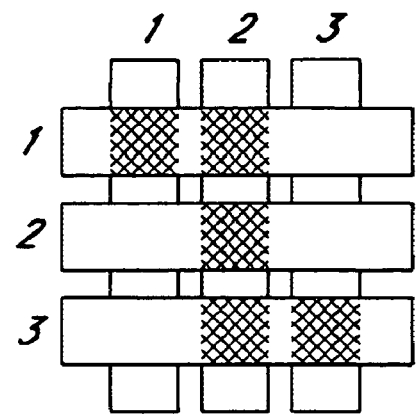
FIGS. 5A and 5B illustrate one exemplary timing diagram for row and column signals that may be used to write a frame of display data to the 3×3 interferometric modulator display of FIG. 2.
Figure 5B:
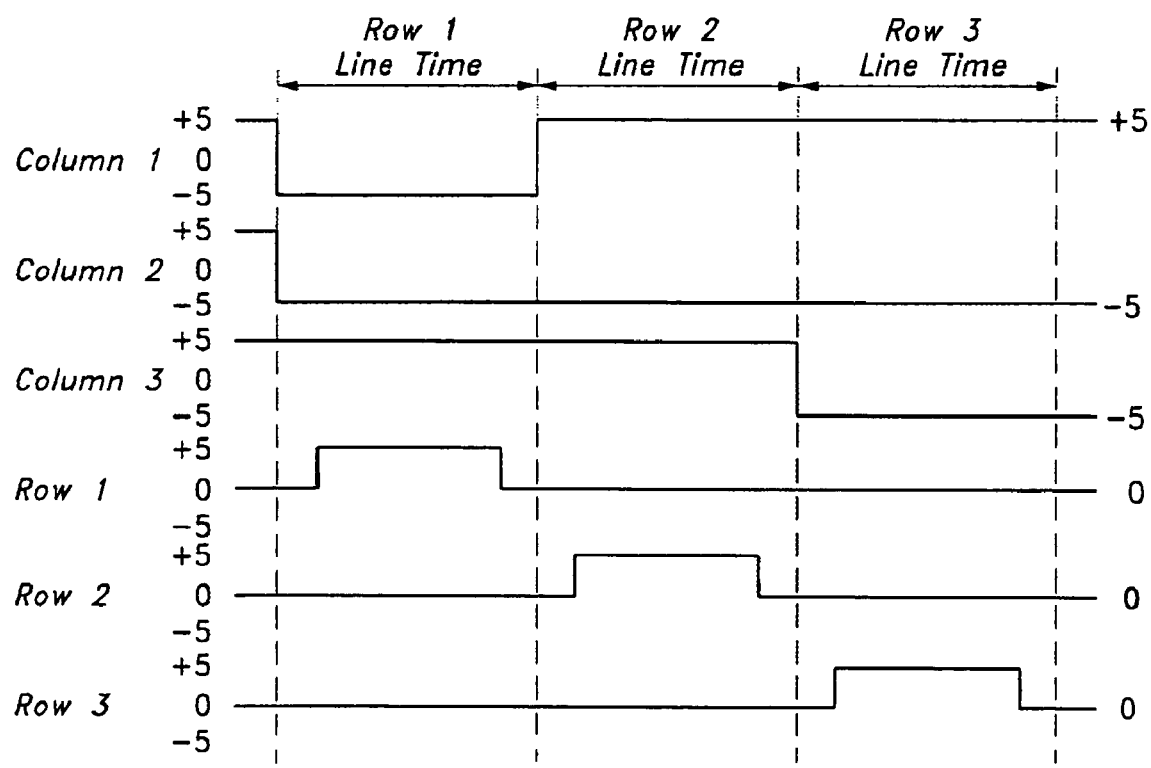

FIG. 5B is a timing diagram showing a series of row and column signals applied to the 3×3 array of FIG. 2 which will result in the display arrangement illustrated in FIG. 5A, where actuated pixels are non-reflective. Prior to writing the frame illustrated in Figure 5A, the pixels can be in any state, and in this example, all the rows are at 0 volts, and all the columns are at +5 volts. With these applied voltages, all pixels are stable in their existing actuated or relaxed states.

In the FIG. 5A frame, pixels (1,1), (1,2), (2,2), (3,2) and (3,3) are actuated. To accomplish this, during a "line time" for row 1, columns 1 and 2 are set to −5 volts, and column 3 is set to +5 volts. This does not change the state of any pixels, because all the pixels remain in the 3-7 volt stability window. Row 1 is then strobed with a pulse that goes from 0, up to 5 volts, and back to zero. This actuates the (1,1) and (1,2) pixels and relaxes the (1,3) pixel. No other pixels in the array are affected. To set row 2 as desired, column 2 is set to −5 volts, and columns 1 and 3 are set to +5 volts. The same strobe applied to row 2 will then actuate pixel (2,2) and relax pixels (2,1) and (2,3). Again, no other pixels of the array are affected. Row 3 is similarly set by setting columns 2 and 3 to −5 volts, and column 1 to +5 volts. The row 3 strobe sets the row 3 pixels as shown in FIG. 5A. After writing the frame, the row potentials are zero, and the column potentials can remain at either +5 or −5 volts, and the display is then stable in the arrangement of FIG. 5A. It will be appreciated that the same procedure can be employed for arrays of dozens or hundreds of rows and columns. It will also be appreciated that the timing, sequence, and levels of voltages used to perform row and column actuation can be varied widely within the general principles outlined above, and the above example is exemplary only, and any actuation voltage method can be used with the systems and methods described herein.

Figure 6A:
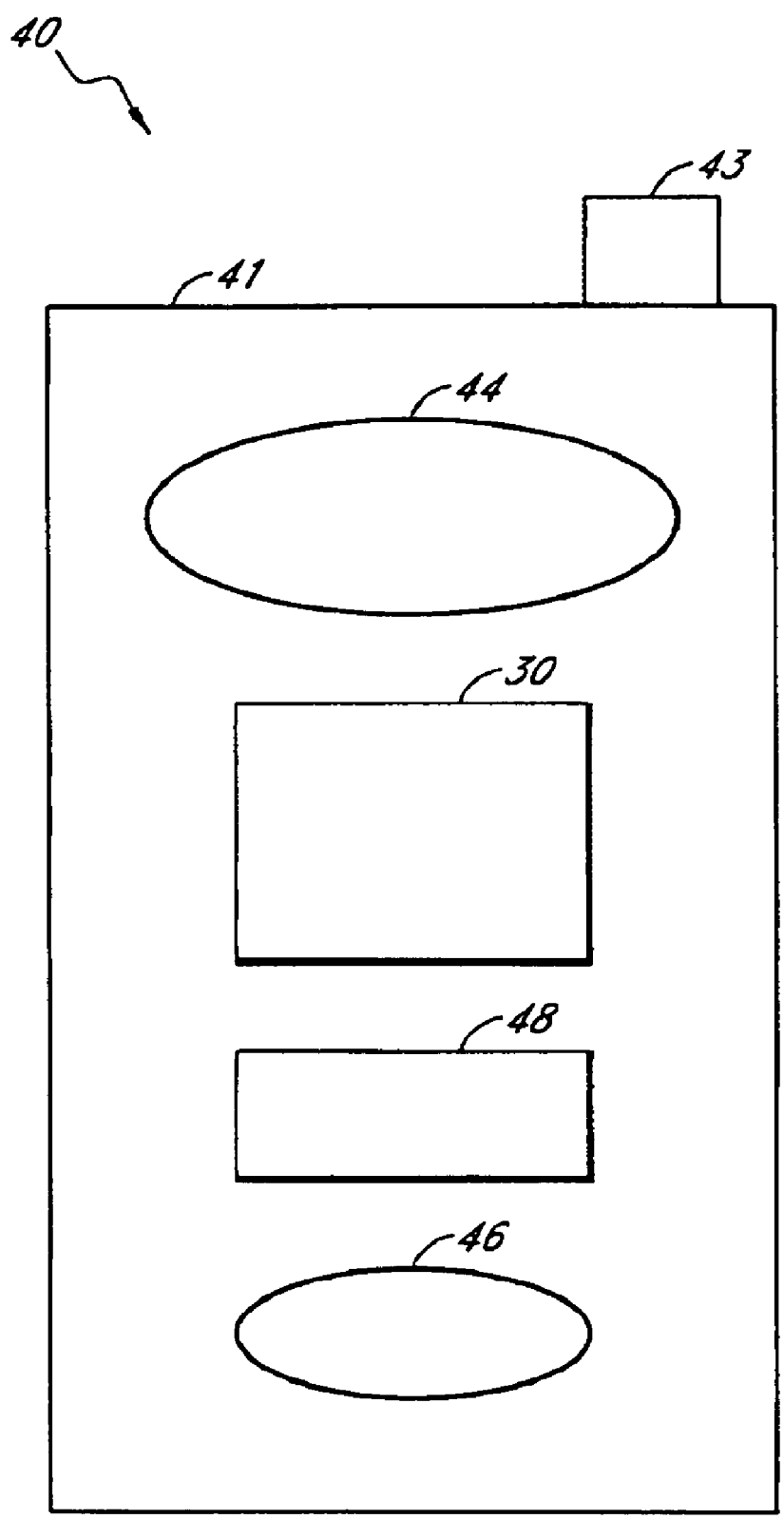
FIGS. 6A and 6B are system block diagrams illustrating an embodiment of a visual display device comprising a plurality of interferometric modulators.
Figure 6B:
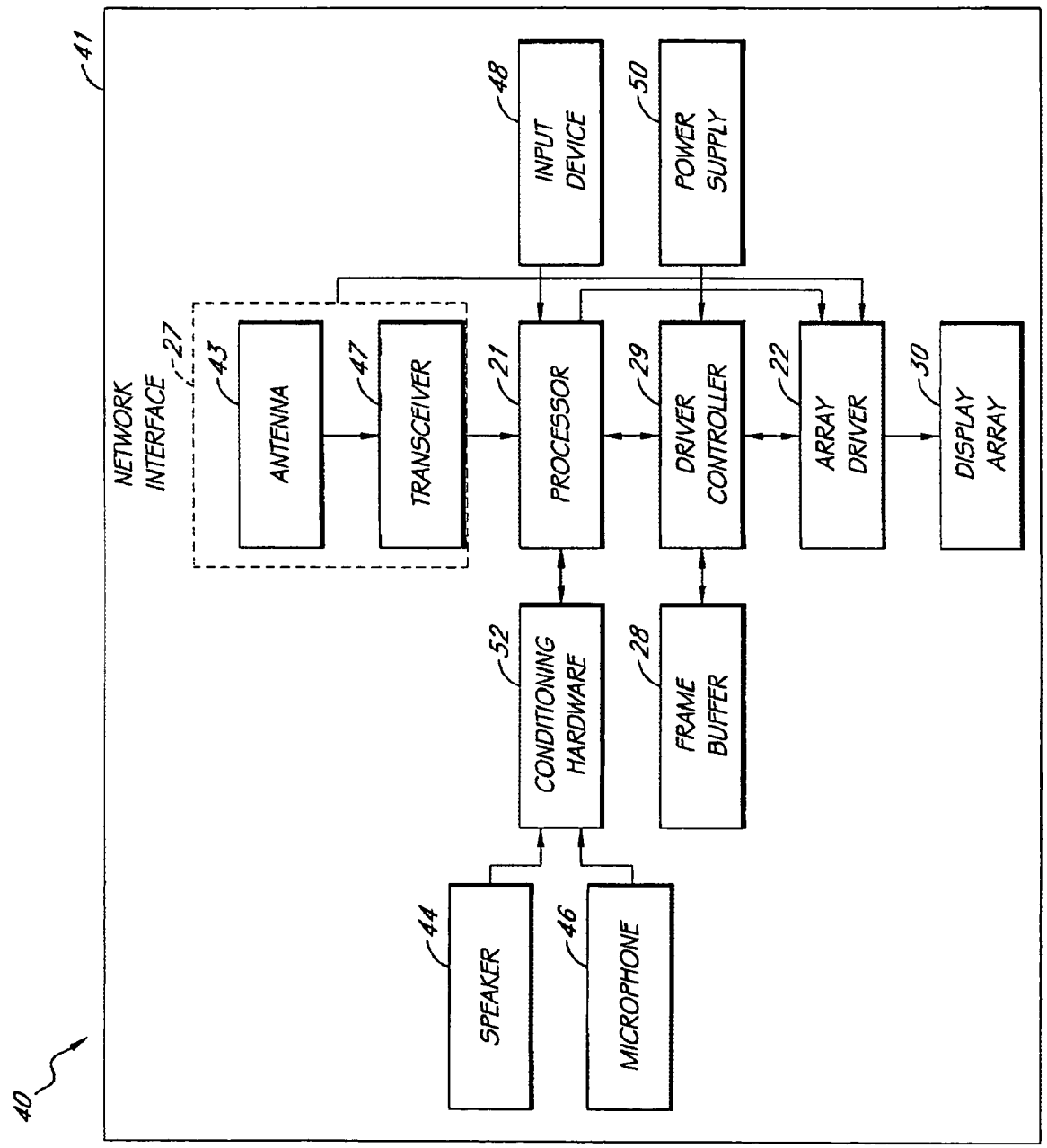

FIGS. 6A and 6B are system block diagrams illustrating an embodiment of a display device 40. The display device 40 can be, for example, a cellular or mobile telephone. However, the same components of display device 40 or slight variations thereof are also illustrative of various types of display devices such as televisions and portable media players.

The display device 40 includes a housing 41, a display 30, an antenna 43, a speaker 44, an input device 48, and a microphone 46. The housing 41 is generally formed from any of a variety of manufacturing processes as are well known to those of skill in the art, including injection molding, and vacuum forming. In addition, the housing 41 may be made from any of a variety of materials, including but not limited to plastic, metal, glass, rubber, and ceramic, or a combination thereof. In one embodiment the housing 41 includes removable portions (not shown) that may be interchanged with other removable portions of different color, or containing different logos, pictures, or symbols.

The display 30 of exemplary display device 40 may be any of a variety of displays, including a bi-stable display, as described herein. In other embodiments, the display 30 includes a flat-panel display, such as plasma, EL, OLED, STN LCD, or TFT LCD as described above, or a non-flat-panel display, such as a CRT or other tube device, as is well known to those of skill in the art. However, for purposes of describing the present embodiment, the display 30 includes an interferometric modulator display, as described herein.

The components of one embodiment of exemplary display device 40 are schematically illustrated in FIG. 6B. The illustrated exemplary display device 40 includes a housing 41 and can include additional components at least partially enclosed therein. For example, in one embodiment, the exemplary display device 40 includes a network interface 27 that includes an antenna 43 which is coupled to a transceiver 47. The transceiver 47 is connected to a processor 21, which is connected to conditioning hardware 52. The conditioning hardware 52 may be configured to condition a signal (e.g. filter a signal). The conditioning hardware 52 is connected to a speaker 45 and a microphone 46. The processor 21 is also connected to an input device 48 and a driver controller 29. The driver controller 29 is coupled to a frame buffer 28, and to an array driver 22, which in turn is coupled to a display array 30. A power supply 50 provides power to all components as required by the particular exemplary display device 40 design.

The network interface 27 includes the antenna 43 and the transceiver 47 so that the exemplary display device 40 can communicate with one ore more devices over a network. In one embodiment the network interface 27 may also have some processing capabilities to relieve requirements of the processor 21. The antenna 43 is any antenna known to those of skill in the art for transmitting and receiving signals. In one embodiment, the antenna transmits and receives RF signals according to the IEEE 802.11 standard, including IEEE 802.11 (a), (b), or (g). In another embodiment, the antenna transmits and receives RF signals according to the BLUETOOTH standard. In the case of a cellular telephone, the antenna is designed to receive CDMA, GSM, AMPS or other known signals that are used to communicate within a wireless cell phone network. The transceiver 47 pre-processes the signals received from the antenna 43 so that they may be received by and further manipulated by the processor 21. The transceiver 47 also processes signals received from the processor 21 so that they may be transmitted from the exemplary display device 40 via the antenna 43.

In an alternative embodiment, the transceiver 47 can be replaced by a receiver. In yet another alternative embodiment, network interface 27 can be replaced by an image source, which can store or generate image data to be sent to the processor 21. For example, the image source can be a digital video disc (DVD) or a hard-disc drive that contains image data, or a software module that generates image data.

Processor 21 generally controls the overall operation of the exemplary display device 40. The processor 21 receives data, such as compressed image data from the network interface 27 or an image source, and processes the data into raw image data or into a format that is readily processed into raw image data. The processor 21 then sends the processed data to the driver controller 29 or to frame buffer 28 for storage. Raw data typically refers to the information that identifies the image characteristics at each location within an image. For example, such image characteristics can include color, saturation, and gray-scale level.

In one embodiment, the processor 21 includes a microcontroller, CPU, or logic unit to control operation of the exemplary display device 40. Conditioning hardware 52 generally includes amplifiers and filters for transmitting signals to the speaker 45, and for receiving signals from the microphone 46. Conditioning hardware 52 may be discrete components within the exemplary display device 40, or may be incorporated within the processor 21 or other components.

The driver controller 29 takes the raw image data generated by the processor 21 either directly from the processor 21 or from the frame buffer 28 and reformats the raw image data appropriately for high speed transmission to the array driver 22. Specifically, the driver controller 29 reformats the raw image data into a data flow having a raster-like format, such that it has a time order suitable for scanning across the display array 30. Then the driver controller 29 sends the formatted information to the array driver 22. Although a driver controller 29, such as a LCD controller, is often associated with the system processor 21 as a stand-alone Integrated Circuit (IC), such controllers may be implemented in many ways. They may be embedded in the processor 21 as hardware, embedded in the processor 21 as software, or fully integrated in hardware with the array driver 22.

Typically, the array driver 22 receives the formatted information from the driver controller 29 and reformats the video data into a parallel set of waveforms that are applied many times per second to the hundreds and sometimes thousands of leads coming from the display's x-y matrix of pixels.

In one embodiment, the driver controller 29, array driver 22, and display array 30 are appropriate for any of the types of displays described herein. For example, in one embodiment, driver controller 29 is a conventional display controller or a bi-stable display controller (e.g., an interferometric modulator controller). In another embodiment, array driver 22 is a conventional driver or a bi-stable display driver (e.g., an interferometric modulator display). In one embodiment, a driver controller 29 is integrated with the array driver 22. Such an embodiment is common in highly integrated systems such as cellular phones, watches, and other small area displays. In yet another embodiment, display array 30 is a typical display array or a bi-stable display array (e.g., a display including an array of interferometric modulators).

The input device 48 allows a user to control the operation of the exemplary display device 40. In one embodiment, input device 48 includes a keypad, such as a QWERTY keyboard or a telephone keypad, a button, a switch, a touch-sensitive screen, a pressure- or heat-sensitive membrane. In one embodiment, the microphone 46 is an input device for the exemplary display device 40. When the microphone 46 is used to input data to the device, voice commands may be provided by a user for controlling operations of the exemplary display device 40.

Power supply 50 can include a variety of energy storage devices as are well known in the art. For example, in one embodiment, power supply 50 is a rechargeable battery, such as a nickel-cadmium battery or a lithium ion battery. In another embodiment, power supply 50 is a renewable energy source, a capacitor, or a solar cell, including a plastic solar cell, and solar-cell paint. In another embodiment, power supply 50 is configured to receive power from a wall outlet.

In some implementations control programmability resides, as described above, in a driver controller which can be located in several places in the electronic display system. In some cases control programmability resides in the array driver 22. Those of skill in the art will recognize that the above-described optimization may be implemented in any number of hardware and/or software components and in various configurations.

Figure 7A:
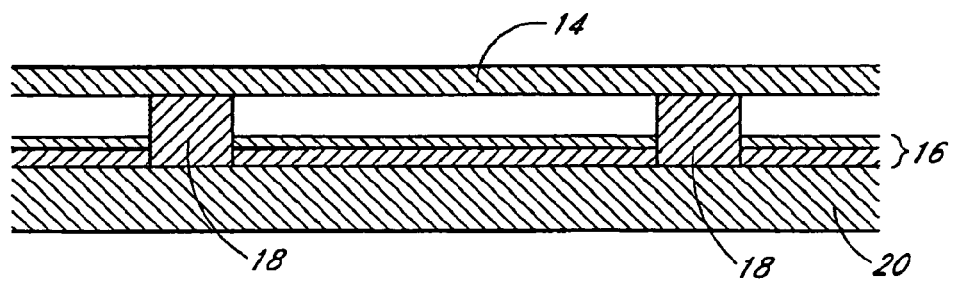
FIG. 7A is a cross section of the device of FIG. 1.
Figure 7B:
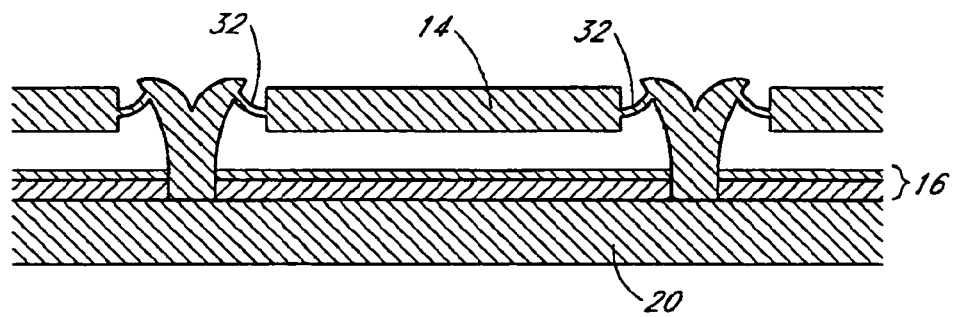
FIG. 7B is a cross section of an alternative embodiment of an interferometric modulator.
Figure 7C:
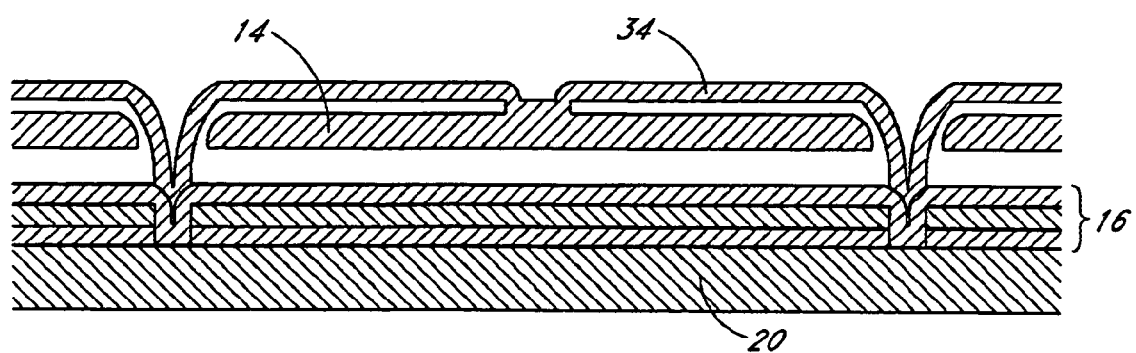
FIG. 7C is a cross section of another alternative embodiment of an interferometric modulator.
Figure 7D:
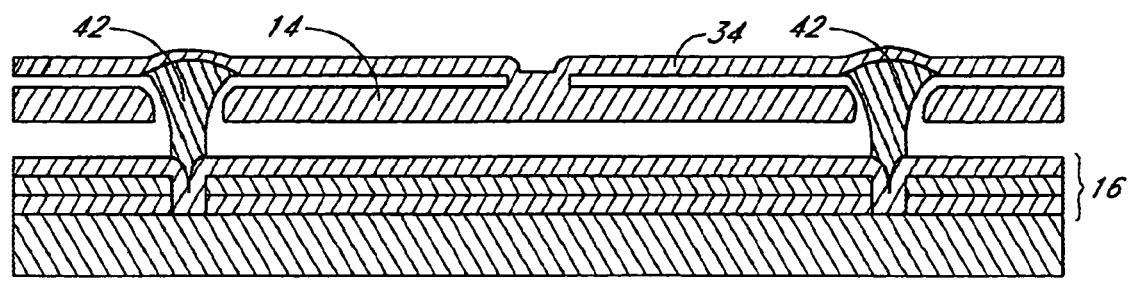
FIG. 7D is a cross section of yet another alternative embodiment of an interferometric modulator.
Figure 7E:
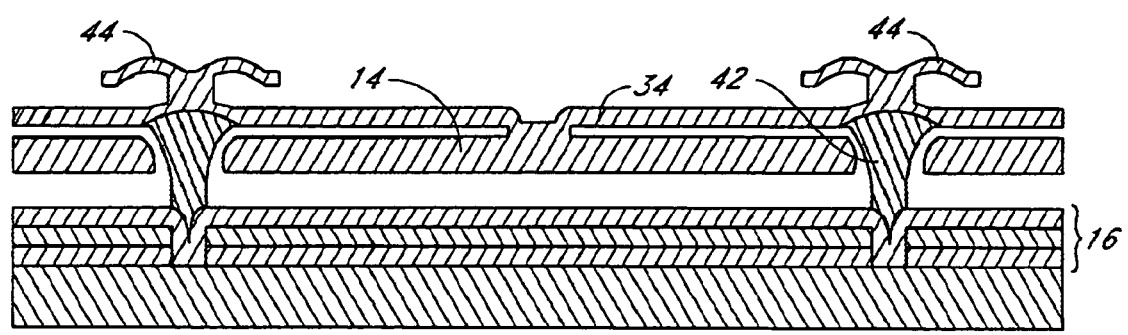
FIG. 7E is a cross section of an additional alternative embodiment of an interferometric modulator.

The details of the structure of interferometric modulators that operate in accordance with the principles set forth above may vary widely. For example, FIGS. 7A-7E illustrate five different embodiments of the movable reflective layer 14 and its supporting structures. FIG. 7A is a cross section of the embodiment of FIG. 1, where a strip of metal material 14 is deposited on orthogonally extending supports 18. In FIG. 7B, the moveable reflective layer 14 is attached to supports at the corners only, on tethers 32. In FIG. 7C, the moveable reflective layer 14 is suspended from a deformable layer 34, which may comprise a flexible metal. The deformable layer 34 connects, directly or indirectly, to the substrate 20 around the perimeter of the deformable layer 34. These connections are herein referred to as support posts. The embodiment illustrated in FIG. 7D has support post plugs 42 upon which the deformable layer 34 rests. The movable reflective layer 14 remains suspended over the cavity, as in FIGS. 7A-7C, but the deformable layer 34 does not form the support posts by filling holes between the deformable layer 34 and the optical stack 16. Rather, the support posts are formed of a planarization material, which is used to form support post plugs 42. The embodiment illustrated in FIG. 7E is based on the embodiment shown in FIG. 7D, but may also be adapted to work with any of the embodiments illustrated in FIGS. 7A-7C as well as additional embodiments not shown. In the embodiment shown in FIG. 7E, an extra layer of metal or other conductive material has been used to form a bus structure 44. This allows signal routing along the back of the interferometric modulators, eliminating a number of electrodes that may otherwise have had to be formed on the substrate 20.

In embodiments such as those shown in FIG. 7, the interferometric modulators function as direct-view devices, in which images are viewed from the front side of the transparent substrate 20, the side opposite to that upon which the modulator is arranged. In these embodiments, the reflective layer 14 optically shields the portions of the interferometric modulator on the side of the reflective layer opposite the substrate 20, including the deformable layer 34. This allows the shielded areas to be configured and operated upon without negatively affecting the image quality. Such shielding allows the bus structure 44 in FIG. 7E, which provides the ability to separate the optical properties of the modulator from the electromechanical properties of the modulator, such as addressing and the movements that result from that addressing. This separable modulator architecture allows the structural design and materials used for the electromechanical aspects and the optical aspects of the modulator to be selected and to function independently of each other. Moreover, the embodiments shown in FIGS. 7C-7E have additional benefits deriving from the decoupling of the optical properties of the reflective layer 14 from its mechanical properties, which are carried out by the deformable layer 34. This allows the structural design and materials used for the reflective layer 14 to be optimized with respect to the optical properties, and the structural design and materials used for the deformable layer 34 to be optimized with respect to desired mechanical properties.

As discussed above, the interferometric modulator is configured to reflect light through the transparent substrate and includes moving parts, such as the movable mirrors 14*a*, 14*b*. Therefore, to allow such moving parts to move, a gap or cavity is preferably created to allow the mechanical parts, such as the movable mirrors 14*a*, 14*b*, of the interferometric modulator to move.

Figure 8A:
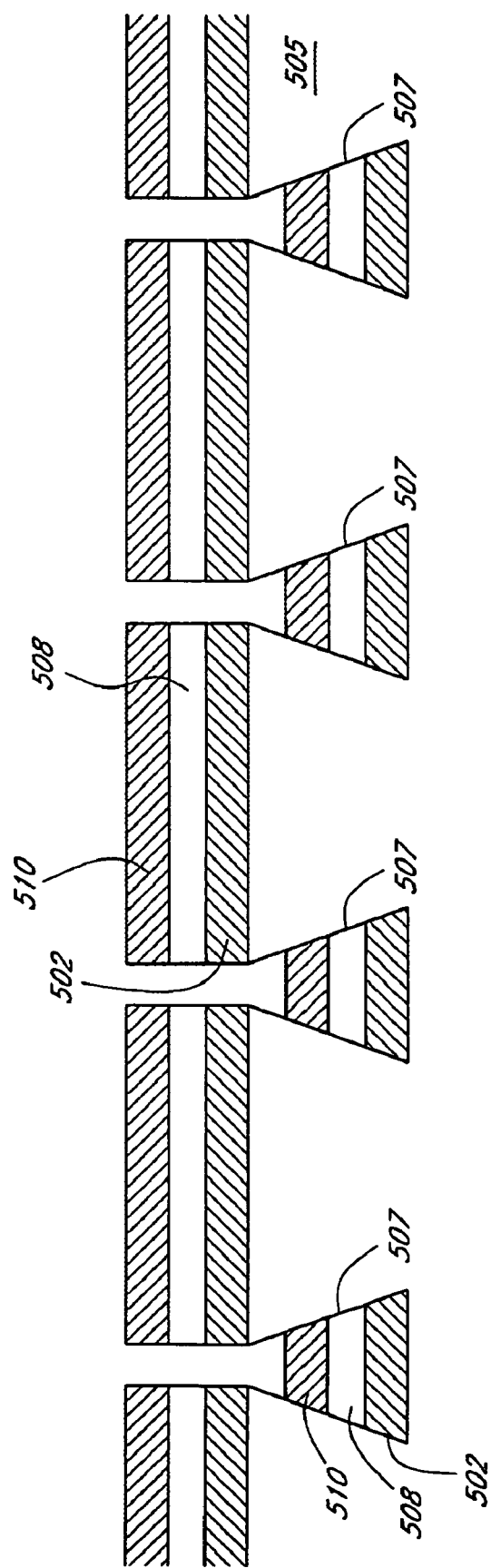
Figure 8C:
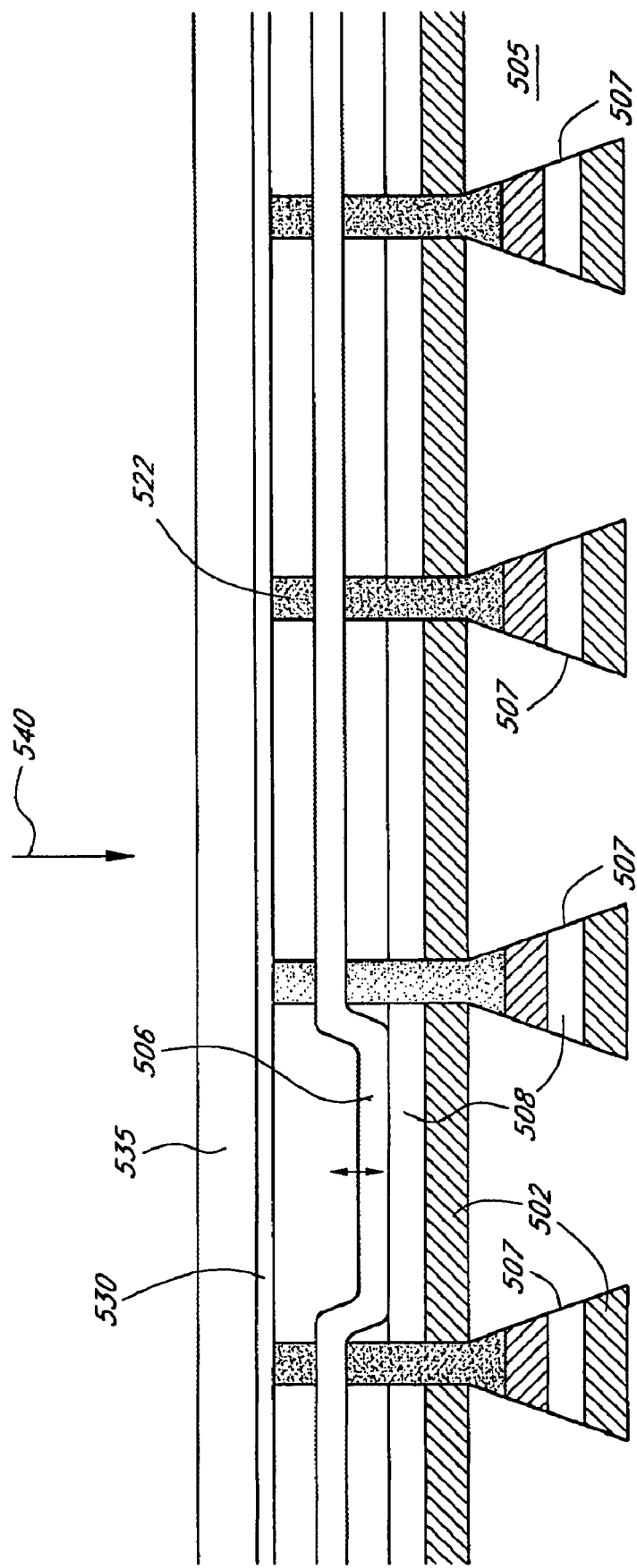

FIGS. 8A-8C are cross-sectional views of an interferometric modulator formed on a pre-patterned substrate, in accordance with an embodiment. It has been found that the steps involved in producing interferometric modulators that function as described above are adaptable to very cost effective production techniques when a pre-patterned substrate is used. FIGS. 8A-8C illustrate one embodiment of such a method, which results in an interferometric modulator that is viewed from the opposite side as the interferometric modulator described above with reference to FIGS. 1-7E. Depending on the final application of the device, it will sometimes be preferable to produce a display viewed through the substrate, and sometimes preferable to produce a display viewed through the deposited layers of the interferometric modulator. Thus, with such a design, it is not necessary to use a transparent substrate (such as transparent substrate 20, shown in FIGS. 7A-7E) on which to form the interferometric modulator. The pre-patterned substrate may therefore be either opaque or transparent. In the illustrated embodiment shown in FIGS. 8A-8C, the pre-patterned substrate is preferably non-transparent, which allows for a selection of materials that are conducive to embossing.

According to the embodiment shown in FIGS. 8A-8C, an interferometric modulator is formed on a pre-patterned substrate 505. A substrate 505 having trenches 507 formed therein is preferably covered with a mirror layer to form a lower electrode (a semi-reflecting or reflecting means) 502, which will serve as the fixed layer described above.

The substrate 505 may be formed from a preferably non-transparent polymer material having a series of embossed, appropriately spaced grooves or trenches 507 running in one direction along the substrate surface. These grooves 507 may be embossed using known techniques in a variety of conventional materials to preferably have a reentrant profile with tapering sides, as shown in FIGS. 8A-8C. In a preferred embodiment, a substrate 505 formed of a composite material is embossed, stamped, ablated, molded, or mechanically imprinted with trenches or grooves, and subsequently baked to obtain the reentrant profile. The skilled artisan will appreciate that such a composite material is preferably formed of different materials in different layers and that after stamping or embossing the substrate, baking causes differential thermal expansion in the different layers. In the illustrated embodiment, the top layer(s) have a higher coefficient of thermal expansion, thereby causing expansion into the grooves 507. Although the reentrant profile is preferred, the skilled artisan will appreciate that the grooves 507 may have other shapes (e.g., vertical walls) so long as the grooves cause a break in material deposited over the top surface of the substrate 505, as discussed in more detail below. It will be understood that the grooves 507 may be formed in the substrate 505 by techniques other than embossing, such as, for example, etching. However, embossing or stamping is preferred as it is an inexpensive process.

When material is deposited on such a surface structure, some material will be deposited and settle into the grooves 507, and some material will be deposited and settle on the top surface of the substrate 505 between the grooves 507. The material is preferably deposited by conventional deposition techniques, such as some form of sputtering, physical vapor deposition, and chemical vapor deposition (CVD). As shown in FIGS. 8A-8C, the presence of the grooves 507 produces breaks or discontinuities in the deposited layers on the top surface of the substrate 505. In this way, the lower layers 502, 508, 510 of the interferometric modulator structure are deposited without the conventional photolithography and etching steps. In this embodiment, effectively, the first set of masks that produces the structure of FIGS. 7A-7E is incorporated into the substrate 505 itself, and conventional masking can, in fact, be replaced by economical embossing processes for the initial electrode pattern. According to this embodiment, the first steps of interferometric modulator structure fabrication are thus depositing the lower electrode 502, a dielectric material 508, and a layer of sacrificial material 510. The layers of the deposited lower electrode 502, dielectric material 508, and sacrificial material 510 are thus formed in rows or strips on the top surface of the substrate 505. The strip structure is produced naturally by the presence of the embossed grooves 507.

The lower electrode 502 is preferably formed of aluminum. In other embodiments, the lower electrode 502 may comprise other highly reflective metals, such as, for example, silver (Ag) or gold (Au). Alternatively, the lower electrode 502 may be a stack of metals configured to give the proper optical and mechanical properties.

A dielectric layer 508 is preferably deposited over the lower electrode 502. In a preferred embodiment, the dielectric material is silicon dioxide ($SiO_2$). A sacrificial layer 510 is preferably deposited (and later removed) over the structure to create a resonant optical cavity between the lower electrode 502 and an upper electrode or reflecting means 506 that will be deposited over the sacrificial layer 510 to form the movable layer, as shown in FIG. 8B. In the illustrated embodiment, the sacrificial layer 510 comprises silicon (Si). In other embodiments, this sacrificial layer 510 may be formed of molybdenum (Mo), tungsten (W), or titanium (Ti). All of these sacrificial materials can be selectively etched, relative to the exposed dielectric and electrode materials, but the skilled artisan will readily appreciate that other sacrificial materials (e.g., photoresist) can be used with other selective etch chemistries.

As shown in FIG. 8B, in this embodiment, interferometric modulator structure production is continued by filling the trenches 507 and the regions between the previously deposited structures. This filling can be done with many conventional deposition/pattern/etch steps or with an etch back process, such as chemical mechanical polishing (CMP) planarization step, for example.

Orthogonal upper electrode strips 506 are preferably deposited over the sacrificial layer 510, followed by strips of a second or upper sacrificial material 520 separated by posts 522. This upper electrode 506 is deposited as strips in rows orthogonal to the lower electrode 502 rows to create the row/column array described above. The upper electrode 506 and sacrificial material 520 may be deposited as strips in their desired patterns, preferably using a shadow mask deposition technique. The posts 522 are formed of insulating materials, preferably a polymer or dielectric material.

A thin, preferably 50-100 angstrom, semi-reflective layer 530 is then preferably deposited over the upper sacrificial layer 520. In a preferred embodiment, the semi-reflective layer 530 is chromium. As shown in FIG. 8B, a transparent material or viewing means 535 is deposited over the semi-reflective layer 530 to provide additional mechanical and structural integrity to the semi-reflective layer 530, which is typically too thin to support itself after removal of the sacrificial layers 510, 520. The skilled artisan will understand that the transparent substrate 535 serves a mechanical function as well as a means through which display takes place and through which light is transmitted. The transparent substrate 535 may be formed of a solid inorganic material, such as an oxide. In another embodiment, the transparent substrate 535 may be formed of a transparent polymer. The semi-reflective layer 530 and the transparent substrate are preferably deposited by conventional deposition techniques, such as sputtering, PVD, and CVD.

The transparent material 535 and semi-reflective layer 530 are preferably etched with openings or holes (not shown) so that the etch gas used for sacrificial layer removal can reach the sacrificial material of layers 510 and 520. Alternatively, the transparent material 535 may be prepatterned with openings or holes that are pre-etched or embossed. It will be understood that, as part of the overall packaging process, the interferometric modulators are sealed and protected from the environment surrounding the package containing the interferometric modulators. Preferably, the holes or openings have a diameter as small as the photolithographic system will permit, and more preferably about 2.4 microns. The skilled artisan will understand that the size, spacing, and number of openings will affect the rate of removal of the sacrificial layers 510, 520.

The sacrificial layers 510, 520 are removed, preferably using a selective gas etching process, to create the optical cavity around the movable electrode 506. Standard etching techniques may be used to remove the sacrificial layers 510, 520. The particular gas etching process will depend on the material to be removed. For example, xenon diflouride ($XeF_2$) may be used as the release gas for removing a silicon sacrificial layer. It will be understood that the etching process is a selective etching process that does not etch any dielectric, semi-reflecting, or electrode materials.

The final structure of the interferometric modulator is shown in FIG. 8C, where there is an optical cavity surrounding the moving electrode 506. Because the semi-reflective layer 530 is on top, the interferometric modulator is viewed through the transparent substrate 535 from the side of the deposited layers in the direction of arrow 540, as shown in FIG. 8C.

In the embodiment shown in FIG. 8A-8C, it will be understood that the movable layer 506 of the interferometric modulator is adjacent the transparent substrate 535 and the fixed layer 502 is formed below the movable layer 506 such that the movable layer 506 may move within the optical cavity of the structure, as shown in FIG. 8C.

Figure 8D:
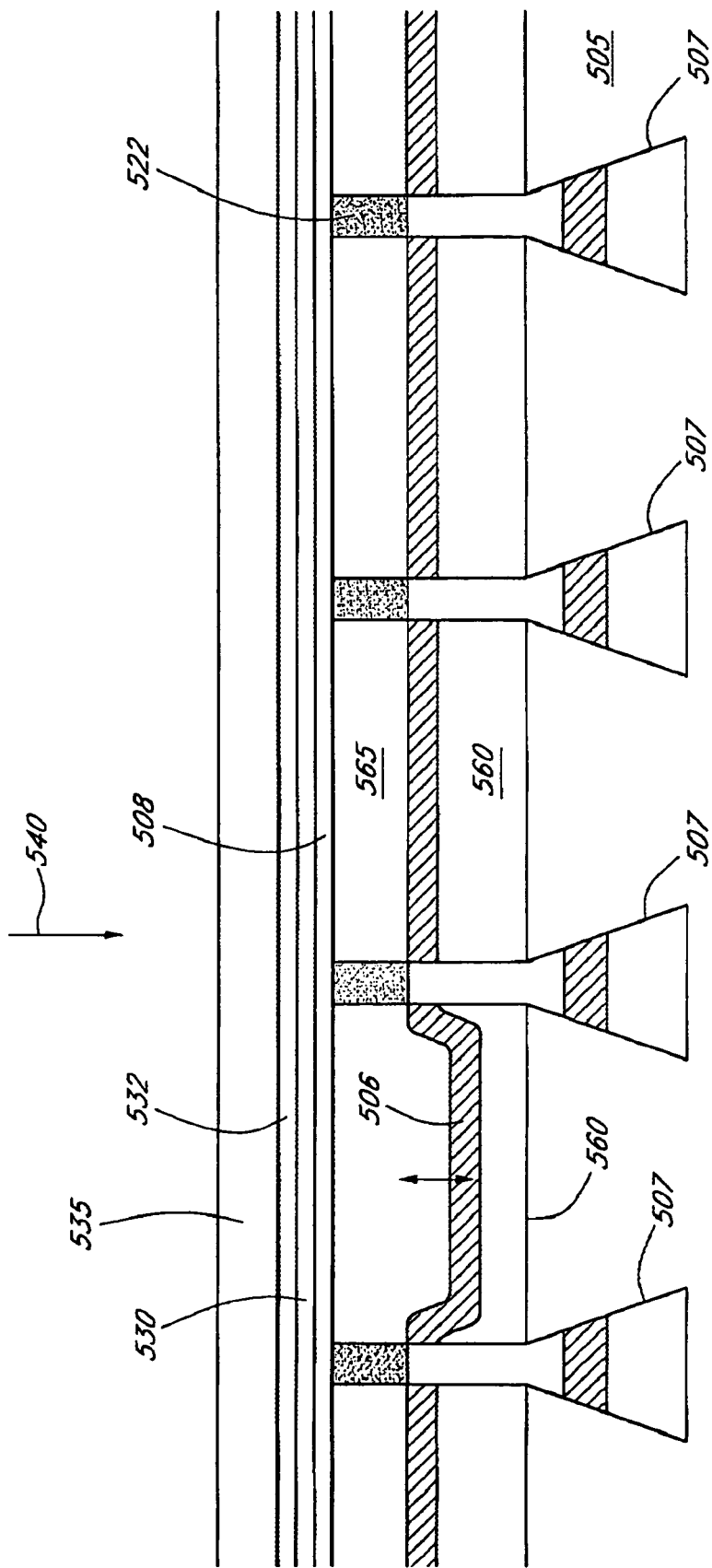
FIG. 8D is a cross-section of an interferometric modulator formed on a pre-patterned substrate, in accordance with another embodiment.

The skilled artisan will appreciate that, in the embodiment shown in FIG. 8D, the semi-reflective layer 530 is preferably chromium and can be supplemented with a transparent electrode, preferably an ITO layer, and used as an electrode. As shown in FIG. 8D, the ITO layer 532 is between the transparent substrate 535 and the chromium layer 530. This ITO-chromium bilayer structure eliminates the need for the lower electrode 502 and dielectric 508 of the embodiment shown in FIGS. 8A-8C. In this embodiment, a dielectric layer 508 is between the chromium 530 and the upper cavity. The skilled artisan will appreciate that a first sacrificial layer (not shown) is deposited on the pre-patterned transparent substrate 505 and later removed to form a lower cavity 560, and a second sacrificial layer (not shown) is deposited over the electrode 506 to form the upper cavity 565. As shown in FIG. 8D, the electrode 506 is deposited over the pre-patterned substrate 505 forming electrode strips on the top surface of the substrate 505, where the discontinuities in the electrode 506 are caused by deposition over the trenches 507.

Figure 8E:
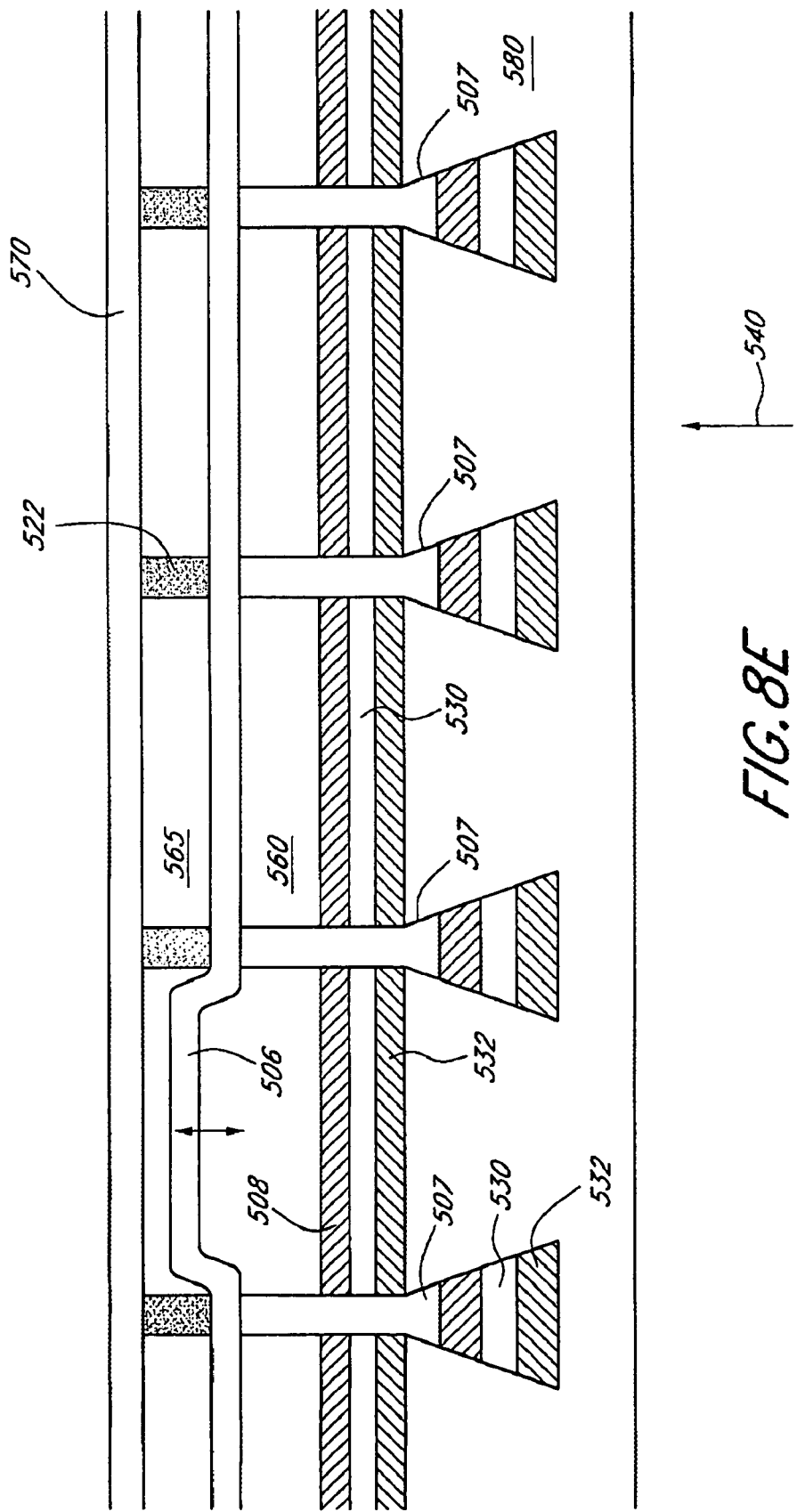
FIG. 8E is a cross-section of an interferometric modulator formed on a pre-patterned substrate, in accordance with yet another embodiment.

As mentioned above, transparent pre-patterned substrates made from transparent materials, such as polymers, may be used to create an interferometric modulator similar to that shown in FIGS. 7A-7E. In such an interferometric modulator, as shown in FIG. 8E, unlike the embodiment shown in FIGS. 8A-8C, the transparent pre-patterned substrate 580 transmits light and viewing takes place through the transparent pre-patterned substrate 580. The skilled artisan will understand that the process for making such an interferometric modulator is similar to the method described above with reference to FIGS. 8A-8C, but that the electrode structure would be reversed. The structure would be similar to that of FIGS. 7A-7E, but the first few patterning and etching steps to create the rows are eliminated by depositing the first layers in rows over the trenches 507.

As shown in FIG. 8E, the semi-reflective-ITO bilayer 530, 532 is deposited over the substrate 580 to form electrode strips. A dielectric layer 508 is deposited over the semi-reflective-ITO bilayer 530, 532. A first sacrificial layer (not shown) is then deposited and later removed to form a lower cavity 560. The movable electrode 506 is deposited in orthogonal strips over the first sacrificial layer. A second sacrificial layer (not shown) is deposited over the movable electrode 506 and late removed to form the upper cavity 565. As shown in FIG. 8E, the movable electrode 506 is in a collapsed state. To complete the structure, a deformable layer 570 is formed over the upper cavity 565.

While the above detailed description has shown, described, and pointed out novel features of the invention as applied to various embodiments, it will be understood that various omissions, substitutions, and changes in the form and details of the device or process illustrated may be made by those skilled in the art without departing from the spirit of the invention. As will be recognized, the present invention may be embodied within a form that does not provide all of the features and benefits set forth herein, as some features may be used or practiced separately from others.

What is claimed is:

1. A display device, comprising:
a substrate embossed having a plurality of grooves formed therein;
a first electrode formed over a top surface of the substrate, wherein the first electrode is discontinuous at the grooves to thereby separate the first electrode into rows;
a second electrode, wherein the first electrode and the second electrode are insulated from each other and separated by a first cavity;
a semi-reflective layer separated from the second electrode by a second cavity; and
a transparent material formed over the semi-reflective layer.

2. The display device of claim 1, wherein the first and second electrodes are insulated from each other by a dielectric material deposited over the first electrode.

3. The display device of claim 1, wherein each of the plurality of grooves has a reentrant profile.

4. The display device of claim 1, wherein the first electrode is orthogonal to the second electrode.

5. The display device of claim 1, wherein the second electrode is configured to be movable.

6. The display device of claim 5, wherein the second cavity is larger and the first cavity is smaller when the second electrode is moved.

7. The display device of claim 1, further comprising:
a display;
a processor that is in electrical communication with said display, said processor being configured to process image data; and
a memory device in electrical communication with said processor.

8. The display device of claim 7, further comprising:
a first controller configured to send at least one signal to said display; and
a second controller configured to send at least a portion of said image data to said first controller.

9. The display system as recited in claim 7, further comprising:
an image source module configured to send said image data to said processor.

10. The display system as recited in claim 9, wherein said image source module comprises at least one of a receiver, transceiver, and transmitter.

11. The display system as recited in claim 7, further comprising:
an input device configured to receive input data and to communicate said input data to said processor.

12. A display device, comprising:
a substrate embossed having a plurality of grooves formed therein;
a first electrode formed over a top surface of the substrate;
a second electrode, wherein the first electrode and the second electrode are insulated from each other and separated by a first cavity;
a semi-reflective layer separated from the second electrode by a second cavity; and
a transparent material formed over the semi-reflective layer, wherein the transparent material has a plurality of holes formed therein.

13. A display device, comprising:
a substrate embossed having a plurality of grooves formed therein, wherein the substrate is opaque;
a first electrode formed over a top surface of the substrate;
a second electrode, wherein the first electrode and the second electrode are insulated from each other and separated by a first cavity;
a semi-reflective layer separated from the second electrode by a second cavity; and
a transparent material formed over the semi-reflective layer.

14. A display device, comprising
a substrate having a plurality of grooves formed therein;
a first reflecting means for reflecting light formed over a top surface of the substrate;
a second reflecting means for reflecting light, wherein the first reflecting means and the second reflecting means are insulated from each other and separated by a first cavity;
a semi-reflective layer separated from the second reflecting means by a second cavity; and
a viewing means for transmitting light, the viewing means formed over the semi-reflective layer, wherein the first reflecting means on the top surface of the substrate is discontinuous at the grooves forming rows of the first reflecting means on the top surface.

15. The display device of claim 14, wherein the second reflecting means is oriented in rows orthogonally to the rows of the first reflecting means.

16. The display device of claim 14, wherein the first and second reflecting means are insulated from each other by a dielectric material deposited over the first reflecting means.

17. The display device of claim 14, wherein the second reflecting means is configured to be movable.

* * * * *